United States Patent
Khalkar et al.

(10) Patent No.: US 11,316,328 B2
(45) Date of Patent: Apr. 26, 2022

(54) WIREWAY AND WIREWAY CONNECTOR FOR WIREWAY SYSTEM

(71) Applicant: Eaton Intelligent Power Limited, Dublin (IE)

(72) Inventors: Amol Khalkar, Nasik (IN); Nicholas R. Grahek, Glen Carbon, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/931,064

(22) Filed: May 13, 2020

(65) Prior Publication Data
US 2020/0366071 A1    Nov. 19, 2020

Related U.S. Application Data

(60) Provisional application No. 62/847,098, filed on May 13, 2019.

(51) Int. Cl.
*H02G 3/06* (2006.01)
*H01R 4/30* (2006.01)
*H02G 3/04* (2006.01)

(52) U.S. Cl.
CPC .......... *H02G 3/0608* (2013.01); *H01R 4/304* (2013.01); *H02G 3/0418* (2013.01); *H02G 3/0437* (2013.01)

(58) Field of Classification Search
CPC .. H02G 3/0608; H02G 3/0418; H02G 3/0437; H02G 3/0431; H02G 3/285; H02G 3/288; H01R 4/304; H01R 11/09; H01R 25/162; H01R 9/2675; Y10T 29/49004; Y10T 16/5448; Y10T 29/49355;
(Continued)

(56) References Cited

U.S. PATENT DOCUMENTS 2,316,166 A * 4/1943 Huguelet ............... H02G 3/263
  285/419
2,757,946 A * 8/1956 Weig ...................... F16L 9/003
  285/419
(Continued)

FOREIGN PATENT DOCUMENTS

AU       199923712 B1    9/2000
DE    202009004970 U1    12/2010
(Continued)

OTHER PUBLICATIONS

International Search Report and Written Opinion for PCT Application No. PCT/EP2020/025218, dated Jul. 15, 2020, 11 pages.

*Primary Examiner* — William H. Mayo, III
*Assistant Examiner* — Krystal Robinson
(74) *Attorney, Agent, or Firm* — Stinson LLP

(57) ABSTRACT

A wireway connector for a wireway section having an open longitudinal end and a plurality of sidewalls includes a connector body having a plurality of side panels. The wireway connector is configured to be attached to an open longitudinal end of a wireway section. A snap-fit component is on at least one of the side panels. The snap-fit component is configured to mateably connect to a snap-fit component on one of the sidewalls of the wireway section as the connector body is attached to the open longitudinal end of the wireway section to connect the wireway connector to the wireway section.

16 Claims, 26 Drawing Sheets

(58) Field of Classification Search
CPC ......... Y10T 29/49826; Y10T 29/49895; Y10T 29/49904; Y10T 29/49947; Y10T 29/5313; F16B 5/0258
See application file for complete search history.

(56) References Cited

U.S. PATENT DOCUMENTS

| | | | |
|---|---|---|---|
| 2,905,201 A * | 9/1959 | McNaughton | H02G 3/0608 285/419 |
| 3,338,599 A * | 8/1967 | Hallman | H02G 3/0608 285/284.1 |
| 5,458,380 A * | 10/1995 | Kanao | F16L 21/005 285/369 |
| 6,143,984 A | 11/2000 | Auteri | |
| 6,216,746 B1 | 4/2001 | Guebre-Tsadik et al. | |
| 6,501,026 B1 | 12/2002 | Piole et al. | |
| 6,609,684 B2 | 8/2003 | Van Scoy et al. | |
| 7,344,163 B2 | 3/2008 | Thompson | |
| 7,360,743 B2 | 4/2008 | Ferris et al. | |
| 7,385,148 B2 | 6/2008 | Picard et al. | |
| 7,654,841 B2 | 2/2010 | Arflack | |
| 7,762,042 B2 * | 7/2010 | Packard, III | H02G 3/0608 52/848 |
| 8,083,187 B2 | 12/2011 | Bernard et al. | |
| 8,093,510 B2 | 1/2012 | Makwinski et al. | |
| 8,534,613 B2 * | 9/2013 | Wurzer | H02G 9/025 248/49 |
| 8,733,723 B2 | 5/2014 | Smith et al. | |
| 9,209,609 B2 | 12/2015 | Kellerman et al. | |
| 9,714,678 B2 | 7/2017 | Nara et al. | |
| 9,768,598 B2 | 9/2017 | Tally et al. | |
| 2002/0158169 A1 | 10/2002 | Benito-Navazo | |
| 2003/0116682 A1 | 6/2003 | Finco et al. | |
| 2006/0169849 A1 | 8/2006 | Saavedra | |
| 2010/0086348 A1 * | 4/2010 | Funahashi | H02G 3/0608 403/306 |
| 2010/0133390 A1 * | 6/2010 | Lange | H02G 3/0418 248/65 |
| 2010/0155133 A1 * | 6/2010 | Makwinski | H02G 3/0431 174/481 |
| 2012/0298188 A1 * | 11/2012 | West | F24S 25/632 136/251 |
| 2014/0346288 A1 * | 11/2014 | Carson | F16L 3/133 248/58 |

FOREIGN PATENT DOCUMENTS

| | | |
|---|---|---|
| EP | 2280463 B1 | 2/2011 |
| EP | 2568552 B1 | 9/2018 |
| ES | 2239882 B1 | 11/2006 |
| ES | 1073243 U | 11/2010 |
| ES | 2363320 B1 | 4/2012 |
| ES | 2455593 T3 | 4/2014 |
| FR | 2998624 B1 | 5/2014 |
| FR | 3004295 A1 | 10/2014 |
| GB | 2399459 B | 2/2005 |
| GB | 2416628 B | 7/2006 |
| GB | 2418300 B | 7/2007 |
| GB | 2421361 B | 5/2009 |
| GB | 2423647 B | 7/2009 |
| GB | 2490455 B | 4/2014 |
| GB | 2476569 B | 11/2014 |
| GB | 2484566 B | 6/2015 |
| GB | 2536971 A | 5/2016 |
| GB | 2494426 B | 6/2016 |
| GB | 2521185 B | 3/2017 |
| JP | 2015-26445 A | 2/2015 |
| KR | 10-0816296 B1 | 3/2008 |
| KR | 20-2012-0002451 B1 | 9/2010 |
| KR | 10-0993138 B1 | 11/2010 |
| KR | 10-1128007 B1 | 11/2010 |
| KR | 10-1182635 B1 | 8/2011 |
| KR | 10-1244055 B1 | 2/2012 |
| KR | 10-1266615 B1 | 3/2012 |
| KR | 10-1291298 B1 | 4/2012 |
| KR | 20-0459803 Y1 | 4/2012 |
| KR | 10-1140026 B1 | 5/2012 |
| KR | 10-1286664 B1 | 2/2013 |
| KR | 10-1349269 B1 | 8/2013 |
| KR | 10-1487507 B1 | 8/2013 |
| KR | 10-1393061 B1 | 9/2013 |
| KR | 10-2015-0102429 B1 | 2/2014 |
| KR | 10-1576611 B1 | 2/2014 |
| KR | 10-1509022 B1 | 4/2014 |
| KR | 10-1640759 B1 | 12/2014 |
| KR | 10-1545917 B1 | 2/2015 |
| KR | 10-2017-0025729 A | 8/2015 |
| KR | 10-1835430 B1 | 11/2015 |
| KR | 10-1820447 B1 | 12/2015 |
| KR | 10-1930368 B1 | 5/2016 |
| KR | 10-1726156 B1 | 11/2016 |
| KR | 10-1766378 B1 | 11/2016 |
| KR | 10-1879158 B1 | 4/2018 |
| RU | 2617837 C2 | 8/2015 |
| WO | 2013015755 A2 | 1/2013 |
| WO | 2013176489 A1 | 11/2013 |
| WO | 2016203068 A1 | 12/2016 |

* cited by examiner

WIREWAY AND WIREWAY CONNECTOR FOR WIREWAY SYSTEM

CROSS-REFERENCE TO RELATED APPLICATION

This application claims priority to U.S. Provisional Patent Application Ser. No. 62/847,098, filed May 13, 2019, which is hereby incorporated by reference in its entirety.

FIELD OF THE DISCLOSURE

The present disclosure generally relates to a wireway and a wireway connector for a wireway system.

BACKGROUND OF THE DISCLOSURE

Wireway systems are constructed to house and guide wires within a structure or other environment. Longitudinal sections of wireways are connected to one another using, for example, wireway connectors which are inserted into and secured to longitudinal ends of abutting wireway sections.

A conventional type of wireway system is offered for sale by Eaton's Cooper B-Line. Such a wireway system is shown in FIGS. 1 and 2. Generally z-shaped slots 3 extend from respective longitudinal ends of a wireway sections, generally indicated at reference numeral 5. A wireway connector, generally indicated at reference numeral 7, includes a pair of screws 9 threaded into each connector sidewall 11. The wireway connector 7 is insertable into the respective longitudinal ends of the wireway sections 5 such that the screws 9 are received in closed end portions of the respective z-shaped slots 3 of the wireway sections. The screws 9 can then be tightened to interconnect the abutting wireway sections 5. An outer wireway connector (not shown) may also be secured over the connection joint or seam.

SUMMARY OF THE DISCLOSURE

In one aspect, a wireway connector for a wireway section having an open longitudinal end and a plurality of sidewalls generally comprises a connector body including a plurality of side panels. The wireway connector is configured to be attached to an open longitudinal end of a wireway section. A snap-fit component is on at least one of the side panels. The snap-fit component is configured to mateably connect to a snap-fit component on one of the sidewalls of the wireway section as the connector body is attached to the open longitudinal end of the wireway section to connect the wireway connector to the wireway section.

In another aspect, a wireway section generally comprises an elongate wireway body including a plurality of sidewalls defining an interior of the wireway section configured to receive one or more wires or cables therein. The wireway body includes opposite longitudinal ends. A snap-fit component is on at least one of the sidewalls adjacent one of the longitudinal ends. The snap-fit component is configured to mateably connect to a snap-fit component on a side panel of a wireway connector as the wireway connector is attached to the open longitudinal end of the wireway section to connect the wireway connector to the wireway section.

In yet another aspect, a wireway system generally comprises a wireway section including at least one sidewall defining an interior. The wireway section has a longitudinal end. A wireway connector includes at least one side panel. The wireway connector is configured to be attached to the longitudinal end of the wireway section. The wireway connector and the wireway section are configured to together form a locking connection automatically upon the wireway connector being inserted into the longitudinal end of the wireway section, without the use of a separate tool, to inhibit the withdrawal of the wireway connector from the wireway section.

DETAILED DESCRIPTION OF THE DISCLOSURE

Figure 5:
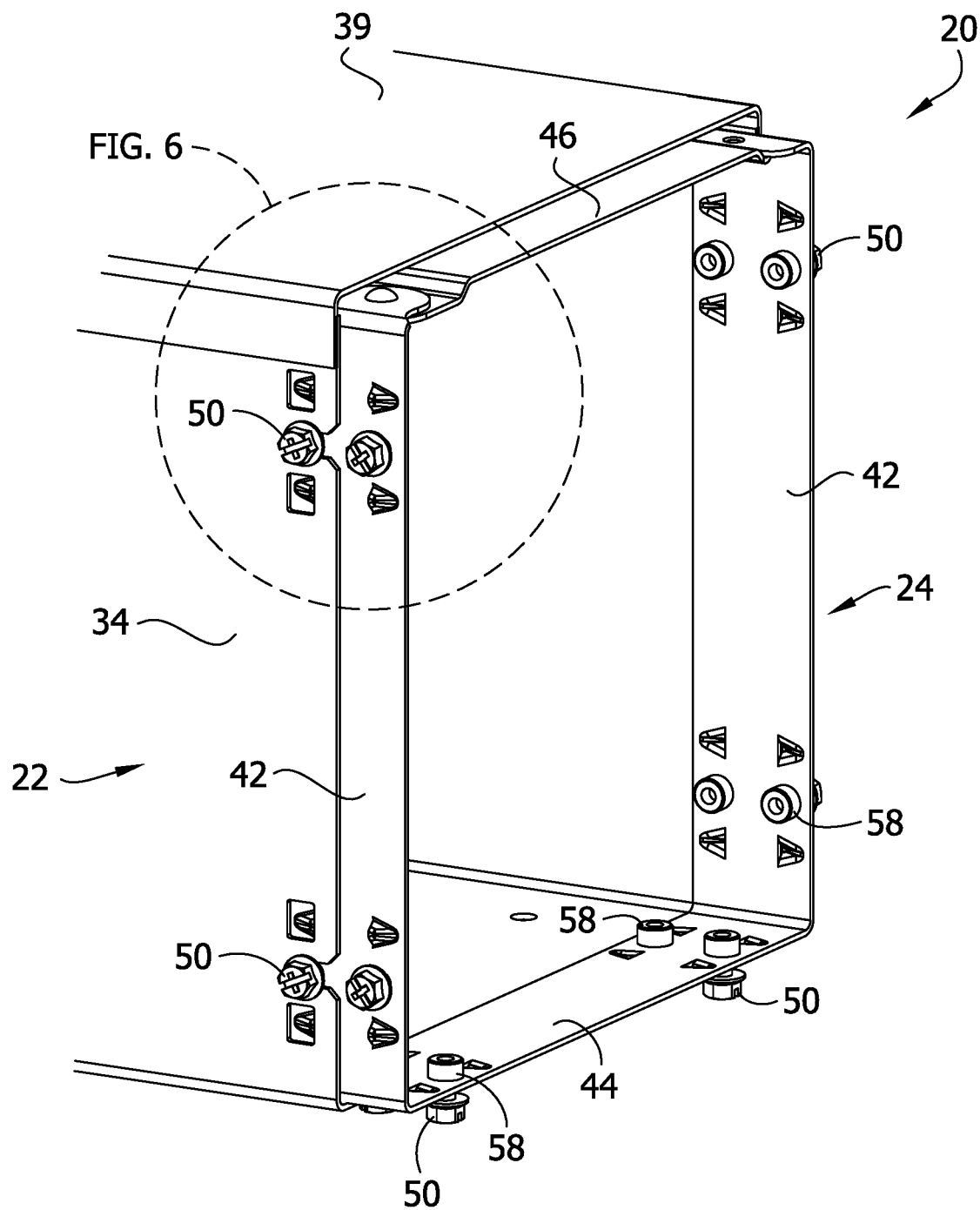
FIG. 5 is a perspective of the wireway section of FIG. 4, including the wireway connector of FOG. 3 inserted in the longitudinal end of the wireway section and an upper cover attached thereto.
Figure 10:
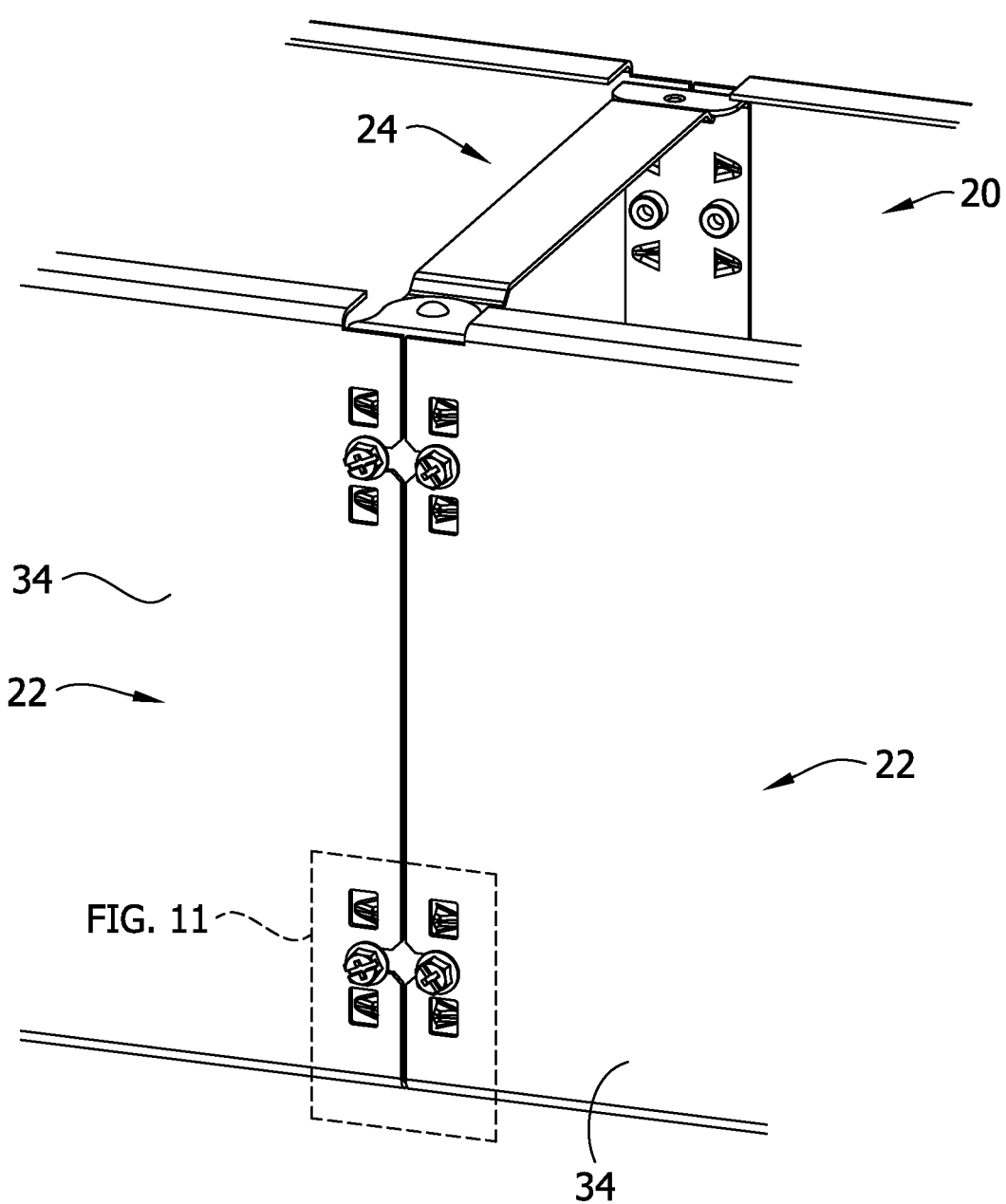
FIG. 10 is a fragmentary perspective of two wireway sections connected to one another via the wireway connector.

Referring to FIG. 5, an illustrated embodiment of a wireway system is generally indicated at reference numeral 20. The wireway system 20 includes at least one wireway section 22 (e.g., two wireway sections, although only one is shown in FIG. 5) and at least one wireway connector 24 (e.g., one wireway connector in the illustrated embodiment), each indicated generally. In use, two adjacent and generally abutting wireway sections 22 are connected to one another using one wireway connector 24 (see FIG. 10). It is understood that the number of wireway sections 22 and wireway connectors 24 for a particular run of the wireway system will depend on the desired length of the wireway run. As will become apparent from the below description and the drawings, the wireway system 20 allows for quick connection of wireway sections. Moreover, the wireway system 20 provides a secure connection of abutting wireway sections 22 and may include two different types of connections.

Figure 4:
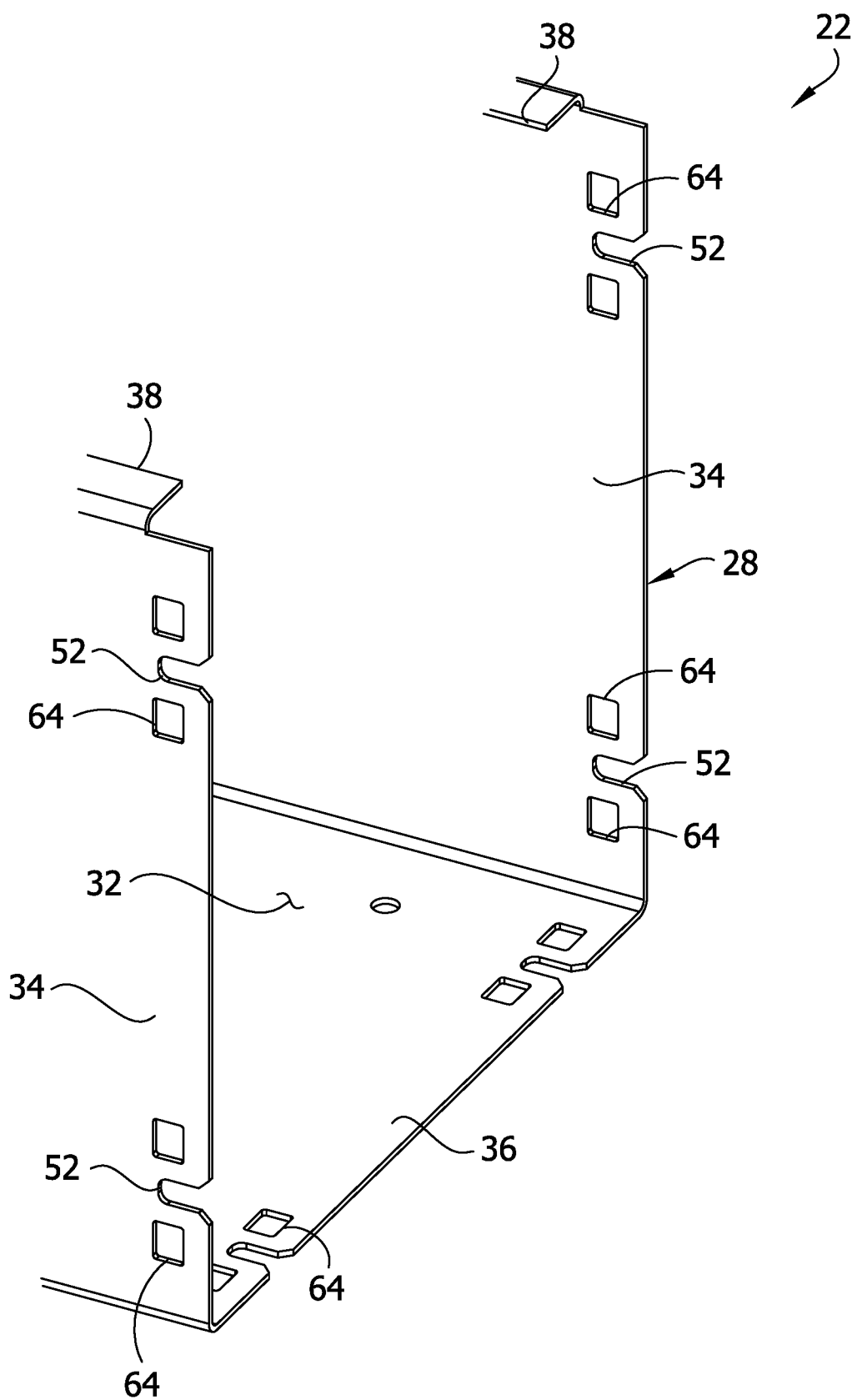
FIG. 4 is a perspective of a longitudinal end of a wireway section constructed according to the teachings of the present disclosure and suitable for use with the wireway connector of FIG. 3.

Referring to FIG. 4, the illustrated wireway section 22 generally includes an elongate wireway body 28 having opposite open longitudinal ends (only one open longitudinal end is illustrated) and a length extending between the open longitudinal ends. The wireway body 28 also has an open upper side leading to an open interior 32 in which wires or cables are receivable and housed. The wireway body 28 includes opposing left and right sidewalls 34 and a lower sidewall 36 interconnecting lower ends of the left and right sidewalls. The sidewalls 34, 36 are generally planar. The wireway body 28 is generally channel-shaped or U-shaped in cross section. Upper flanges 38 extend inward from upper ends of the respective left and right sidewalls 34, 36. The wireway sections 22 may also include an elongate cover 39 (FIGS. 5 and 6) that is removably or hingedly attached to the wireway body 28 to selectively: i) cover the open upper side of the wireway body to close the open upper side; and ii) uncover the open upper side of the wireway body to allow access to the open side. The wireway section 22 may be formed from metal, plastic, or other material. For example, the wireway section 22 may be formed from sheet metal, such as by bending a piece of sheet metal into the desired shape of the wireway section. In another example, the wireway section 22 may be formed by molding, such as where the wireway section is made from plastic. The wireway section 22 may be made by extrusion in another example, or in other suitable ways. It is understood that the wireway section 22 may be of other designs and configurations. For example, the wireway body 28 may include an upper sidewall such that the upper side is closed and the wireway body is generally rectangular in cross section. In one or more other embodiments, one or more of the sidewalls 34, 36 may not be planar, for example the lower sidewall 36 may be concave in cross section.

Figure 1:
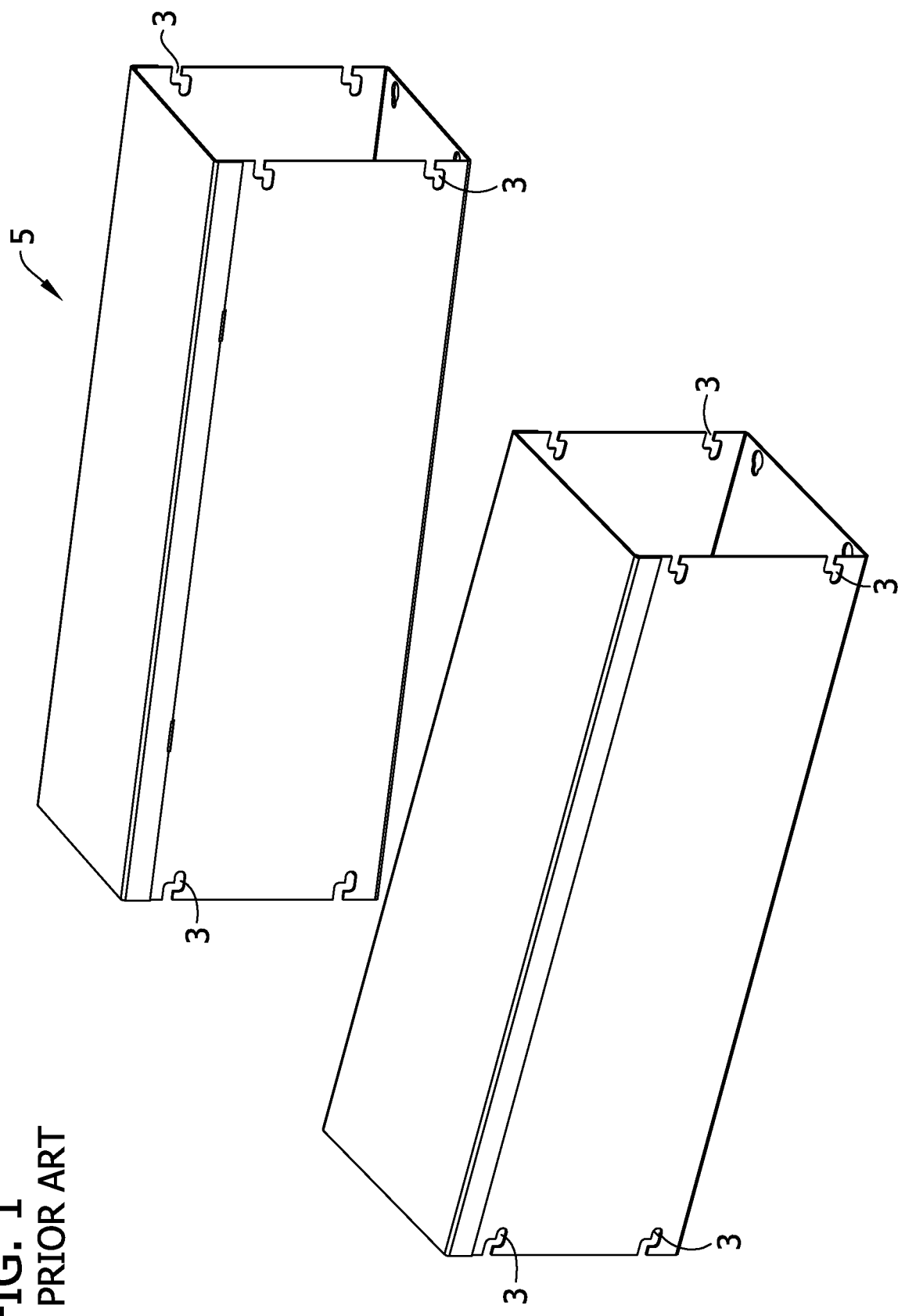
FIG. 1 is a perspective of two conventional wireway sections for a conventional wireway system.
Figure 2:
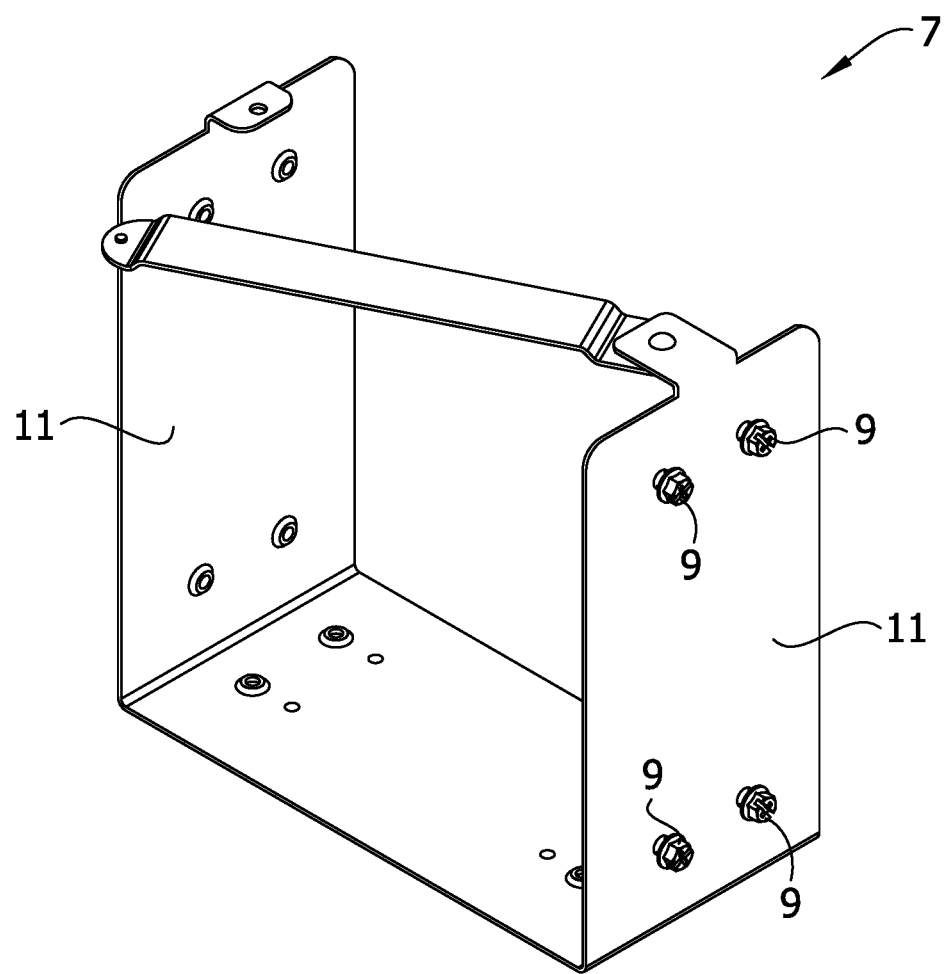
FIG. 2 is a perspective of a conventional wireway connector for the conventional wireway section.
Figure 3:
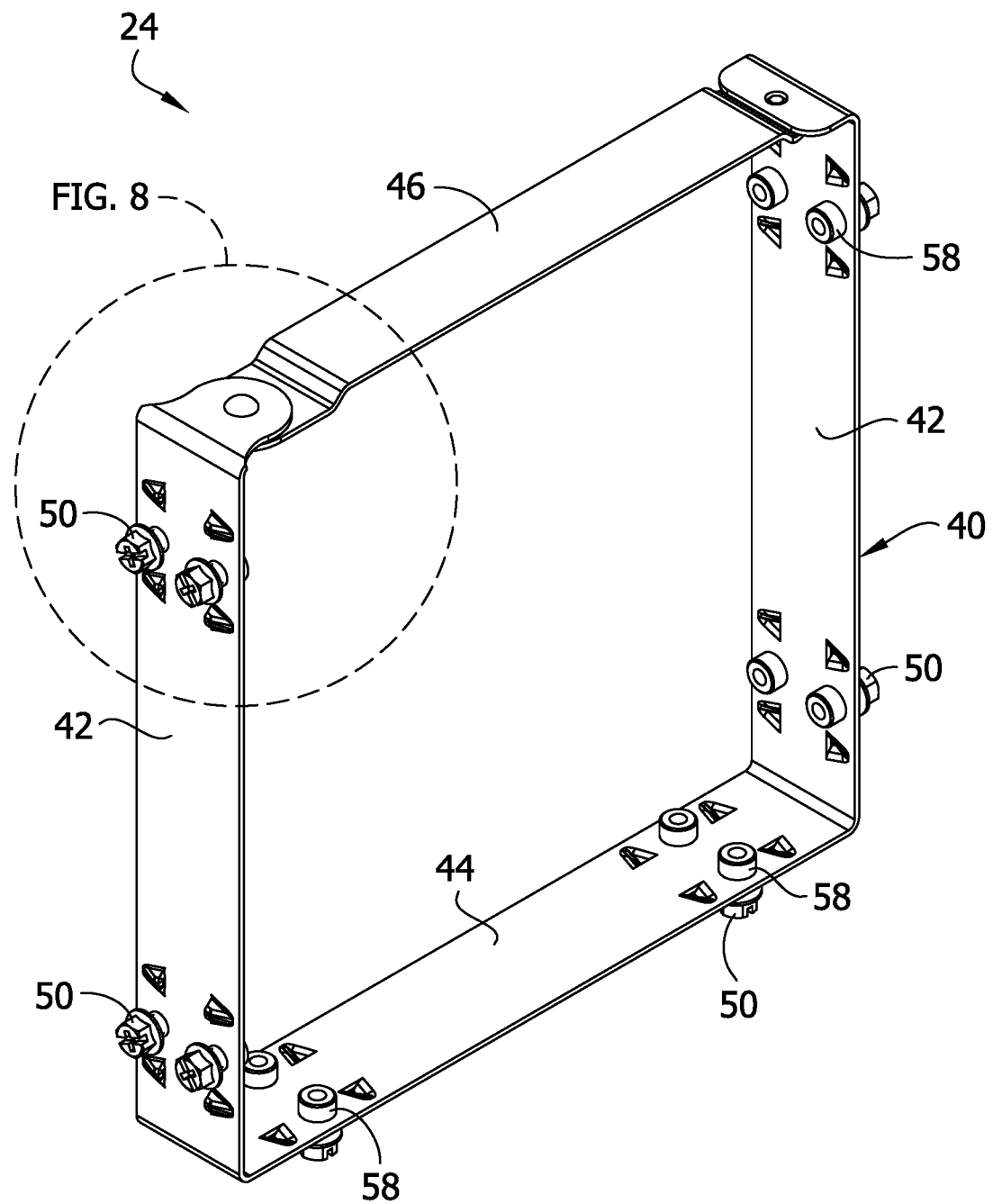
FIG. 3 is a perspective of one embodiment of a wireway connector constructed according to the teachings of the present disclosure.

Referring to FIG. 3, for example, the illustrated wireway connector 24 generally includes a connector body 40 having opposite open axial ends. The connector body 40 includes opposing left and right side panels 42 and a lower side panel 44 interconnecting lower ends of the left and right sidewalls. An upper side panel 46 is hingedly connected to one of the left and right side panels 42. The upper side panel 46 is rotatable about the hinge to selectively extend across to the other of the left and right side panels 42 and be fastened thereto such as by a fastener extending through aligned openings. The upper side panel 46 is also rotatable to swing open to extend generally transverse to the other side panels 42, 44. The side panels 42, 44, 46 are generally planar. The connector body 40 is generally rectangular in cross section. The connector body 40 may be formed from metal, plastic, or other material. For example, the connector body 40 may be formed from sheet metal, such as by bending a piece of sheet metal. In another example, the connector body 40 may be formed by molding, such as where the connector body is made from plastic. The connector body 40 may be made by extrusion in another example, or in other suitable ways. It is understood that the connector body 40 may be of other designs and configurations. For example, the connector body 40 may not include an upper sidewall such that the connector body is generally U-shaped or channel-shaped in cross section. In one or more other embodiments, one or more of the sidewalls 42, 44, 46 may not be planar, for example the lower sidewall may be concave in cross section. The connector body 40 is generally sized and shaped to fit snugly within the interior of the wireway body 28 such that the side panels 42, 44, 46 of the connector body 40 generally oppose an inner surface the corresponding side walls 34, 36 and cover 39 of the wireway body. Thus, the connector body 40 generally corresponds in cross-sectional shape with the wireway body 28.

Referring to FIGS. 5, 6, 10, and 11, in the illustrated embodiment, the wireway section 22 and the wireway connector 24 are configured to be fastened together using a primary connection (broadly, a first connection) and an auxiliary connection (broadly, a second connection). In the illustrated embodiment, the primary connection comprises a threaded fastener 50 (e.g., a screw or bolt or stud) secured to the wireway connector 24 and received in a slot 52 (broadly, a slot shaped fastener opening) of the wireway section 22 to couple the wireway connector to the wireway section. Also in the illustrated embodiment, the auxiliary connection comprises a quick-connection connection. As an example, the wireway section 22 and the wireway connector 24 are automatically fastened to one another by the quick-connect connection by inserting the wireway connector into one of the open longitudinal ends of the wireway section. That is, no tools or additional steps are required to fasten using the quick-connect connection. As illustrated, the quick-connect connection may include quick-connect components integrally formed with the wireway body 28 and/or the connector body 40. In general, in one or more embodiments, the auxiliary connection may also or alternatively be a safeguard connection that inhibits disconnection of the primary connection (e.g., inhibits the threaded fasteners 50 from withdrawing from the slot 52 in the wireway section 22). The illustrated quick-connect connection is also a safeguard connection. In one or more other embodiments, the auxiliary connection may not be a quick-connect connection, but may be a safeguard connection whereby the auxiliary connection inhibits disengagement of the wireway section 22 should the primary connection not sufficiently maintain the wireway sections secured to one another.

In the illustrated embodiment, the primary or first type of connection comprises at least one externally threaded fastener 50 (e.g., a pair of fasteners) extending through at least one of the left and right panels 42 and the lower side panels 44 of the wireway connector 24, and a plurality of corresponding pairs of internally threaded fasteners 58 (e.g., cinch nuts) mateable with the externally threaded fasteners 50. In one example, the externally threaded fasteners 50 comprise bolts or screws or other types of fasteners. The externally threaded fasteners 50 are received in circular fastener holes 59 in the side panels 42, 44 to retain the fasteners to the wireway connector 24. The externally threaded fasteners 50 in each respective pair are spaced apart from one another axially along the corresponding side panels 42, 44 so that one of the fasteners is used to fasten the wireway connector 24 to the first wireway section 22, and the other one of the fasteners is used to fasten the wireway connector to the second wireway section. In one example, the internally threaded fasteners 58 comprise an internally threaded boss or nut or other internally threaded fastener. In the illustrated embodiment, the internally threaded fastener 58 is on the interior of the wireway connector 24 and may be integrally formed therewith or secured thereto, such as by welding. In one or more other embodiments, the threaded fastener 50 may be threadably secured to the wireway connector 24 in other ways.

Referring to FIGS. 4, 6, 10, and 11, for example, in addition to the threaded fasteners 58, the primary connection further comprises fastener openings (e.g., slots) defined by the longitudinal end margin(s) of the wireway body 28. The slots 52 are sized and shaped to receive threaded shafts of the externally threaded fasteners 50 by moving the threaded shafts axially into the openings, and inhibit heads of the external threaded fasteners from passing therethrough when the external fasteners are threaded into the internal fasteners 58. In the illustrated embodiment, the slots 52 extend through the longitudinal end(s) of the wireway body 28. The illustrated slots 52 are elongate and extend longitudinally along the wireway section 22 in a generally straight or linear path. The slots 52 allow the threaded shafts of the externally threaded fasteners 50 to slide longitudinally into the slots 52 as the wireway connector 24 is inserted into the open longitudinal end of the wireway section 22. After inserting the threaded shafts into the slots 52, the externally threaded fasteners 50 can be tightened (e.g., rotated) to fasten the wireway connector 24 to the wireway section 22. Tightening the externally threaded fasteners 50 will cause the fasteners to move transversely toward the open interior 32 of the wireway body 28. The width of the slots 52 will not allow the heads of externally threaded fasteners 50 to pass into the open interior 32 of the wireway body 28. In one or more other embodiments, the first type of connection may comprise other types of connectors or fasteners suitable to connect the wireway connector to abutting wireway sections.

Figure 6:
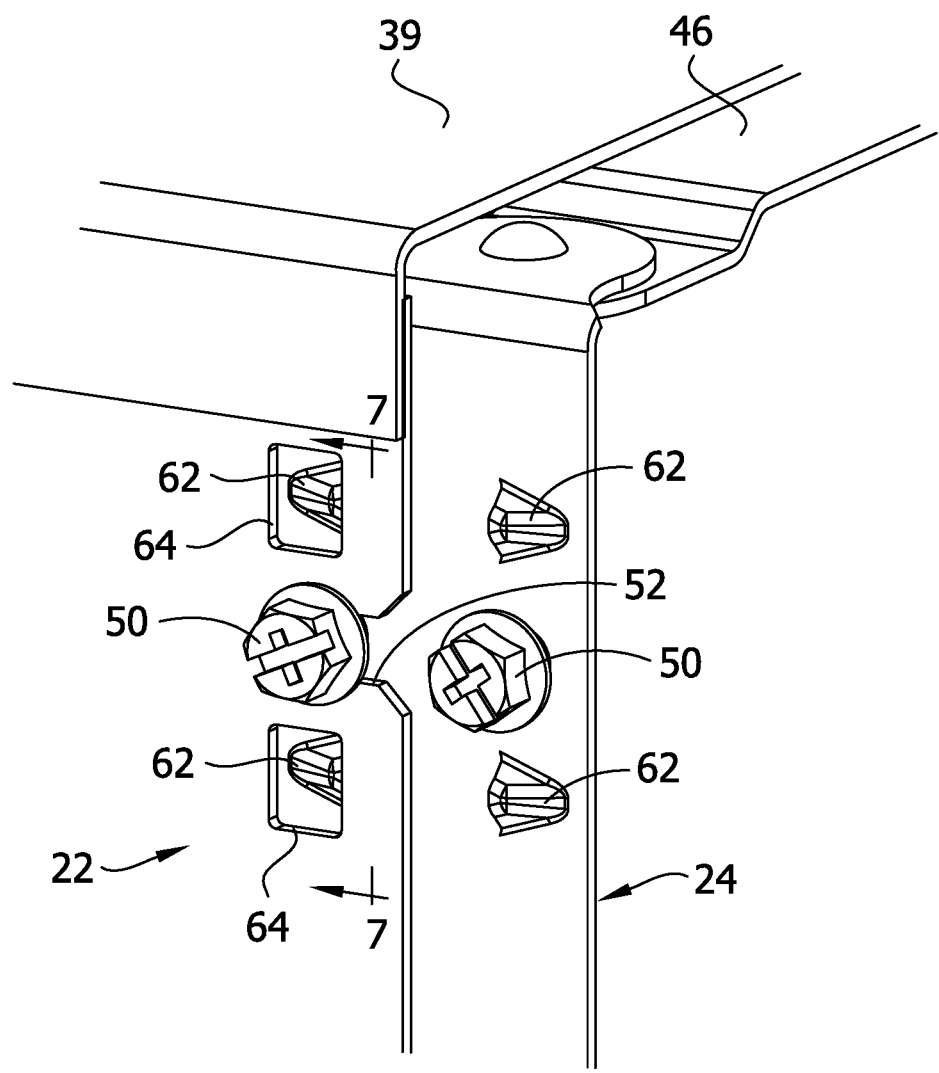
FIG. 6 is an enlarged fragmentary view of FIG. 5.
Figure 8:
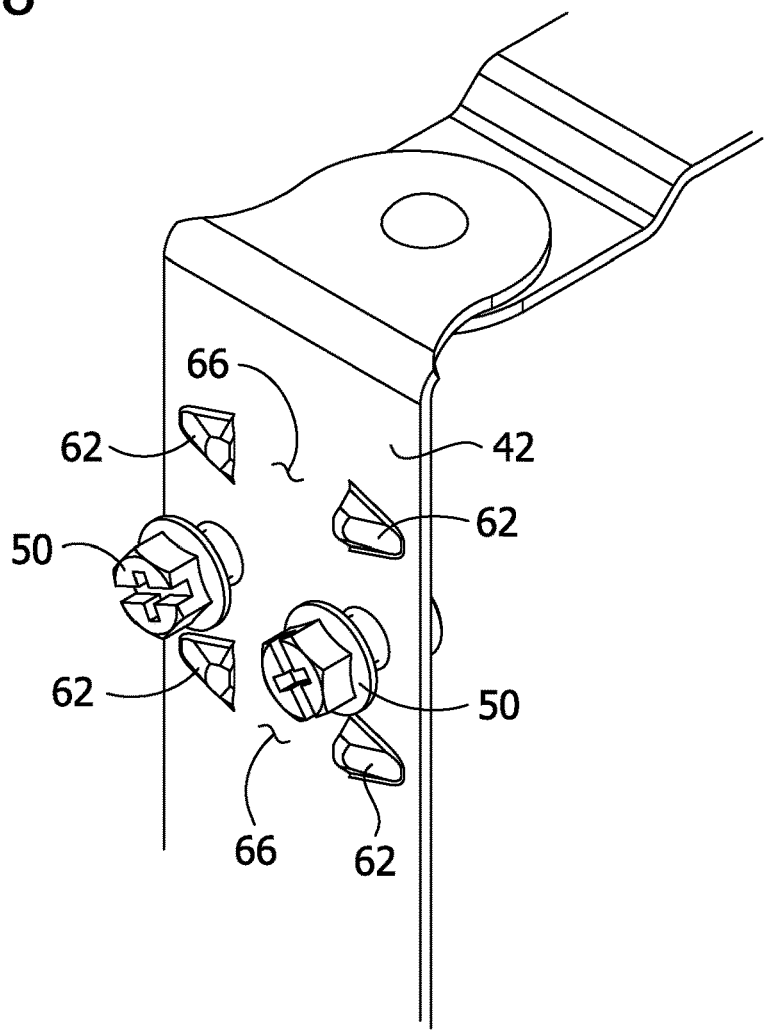
FIG. 8 is an enlarged fragmentary view of the wireway connector of FIG. 3.
Figure 9:
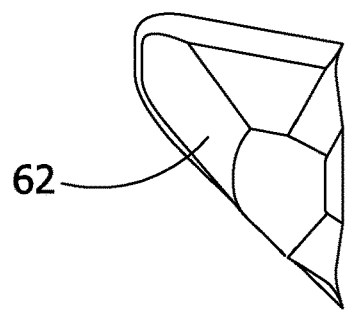
FIG. 9 is an enlarged fragmentary view one of a plurality of catches or detents on the wireway connector of FIG. 8.
Figure 11:
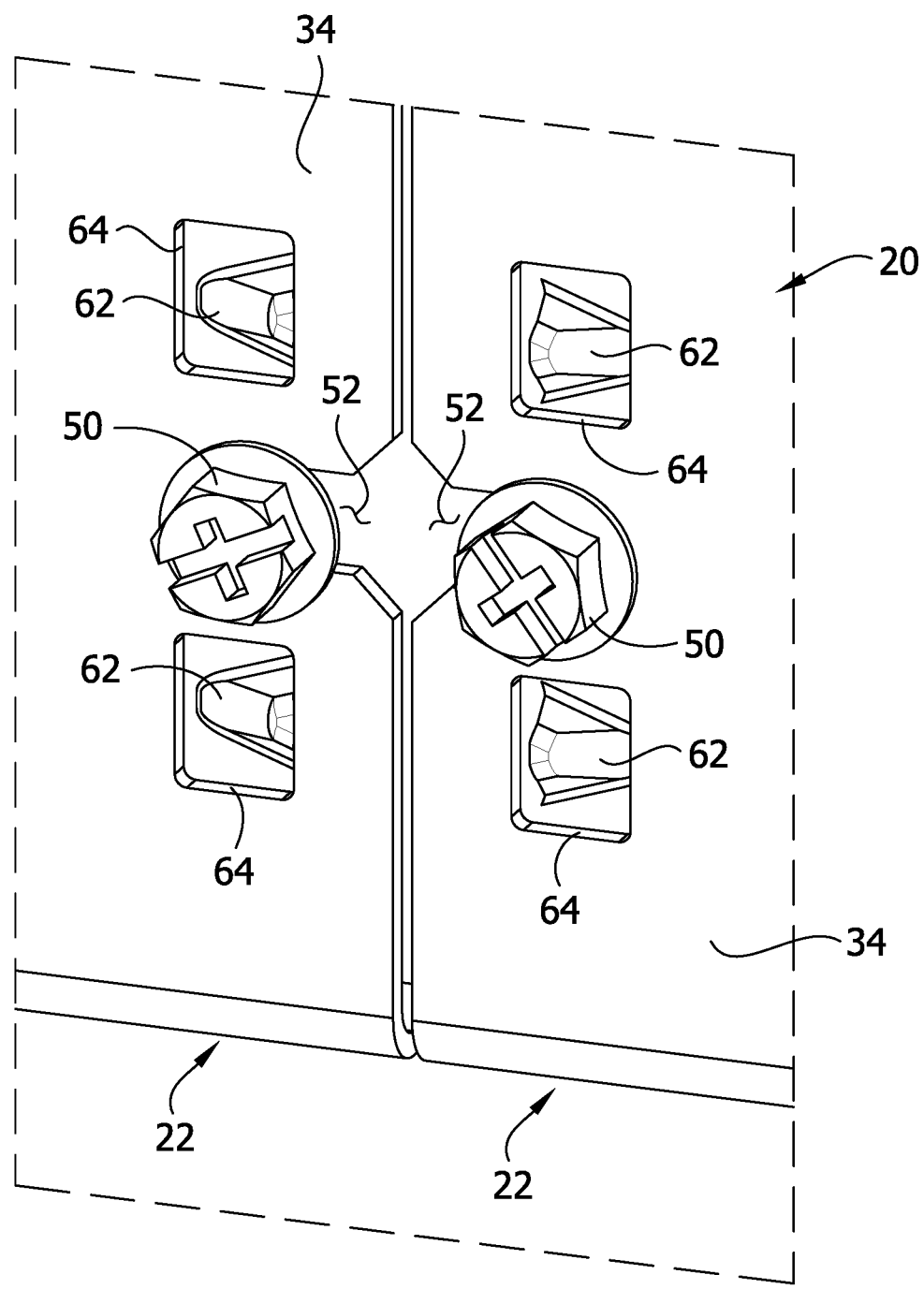
FIG. 11 is an enlarged fragmentary view of FIG. 10.
Figure 12:
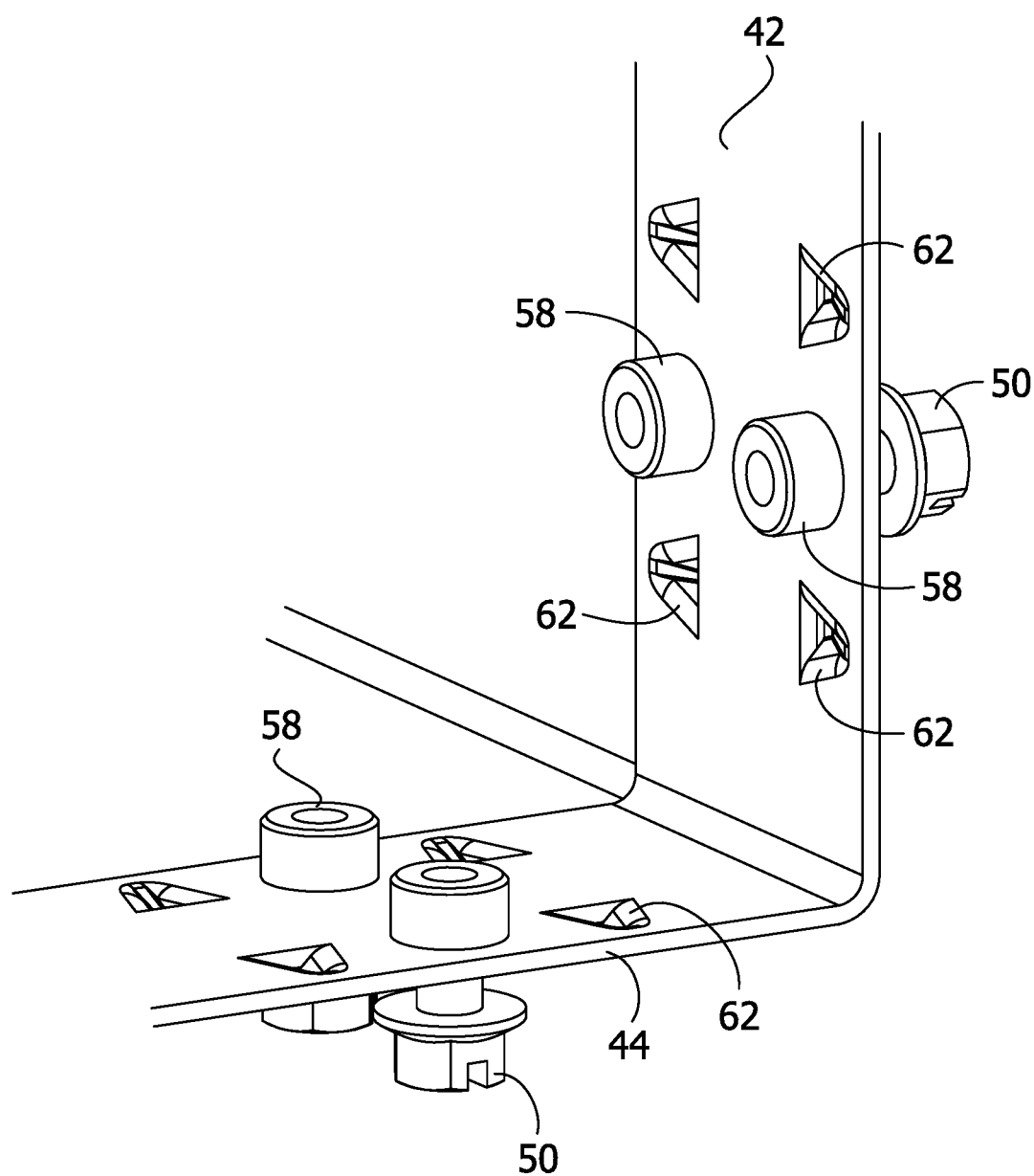
FIG. 12 is an enlarged perspective of an interior of the wireway connector.

The illustrated auxiliary connection generally comprises a snap-fit connection. As shown in FIGS. 6 and 11, for example, the snap-fit connection includes at least one first type of snap-fit connector 62 on the connector body 40 that is connectable to (e.g., mateable with) a plurality of a second type of snap-fit connector 64 on the wireway body 28 to secure the wireway connector 24 to the wireway section 22. The illustrated plurality of the first type of snap-fit connector 62 comprises catches or detents projecting laterally outward from one or more of the side panels 42, 44 of the connector body 24. For example, the catches 62 may project from the left, right and lower side panels 42, 44. In the illustrated embodiment, a set of catches 62 (or a set of the first type of snap-fit connector) are disposed adjacent to each pair of fasteners 50 on the connector body 40. For example, as shown best in FIG. 8, each set of catches 62 includes an upper pair of catches disposed above the pair of fasteners 50, and a lower pair of catches below the pair of fasteners. It is understood that the plurality of the first type of snap-fit connector 62 may be disposed at other locations on the corresponding side panels. The catches 62 in each pair generally oppose one another and are axially spaced apart and aligned along the connector body 40. The lateral extent (or height) of each catch 62 increases gradually (or slopes outward) toward an inner end of the catch. In this way, each pair of catches 62 forms opposing ramps leading to a clearance gap 66 between the inner ends of the opposing ramps.

Figure 7:
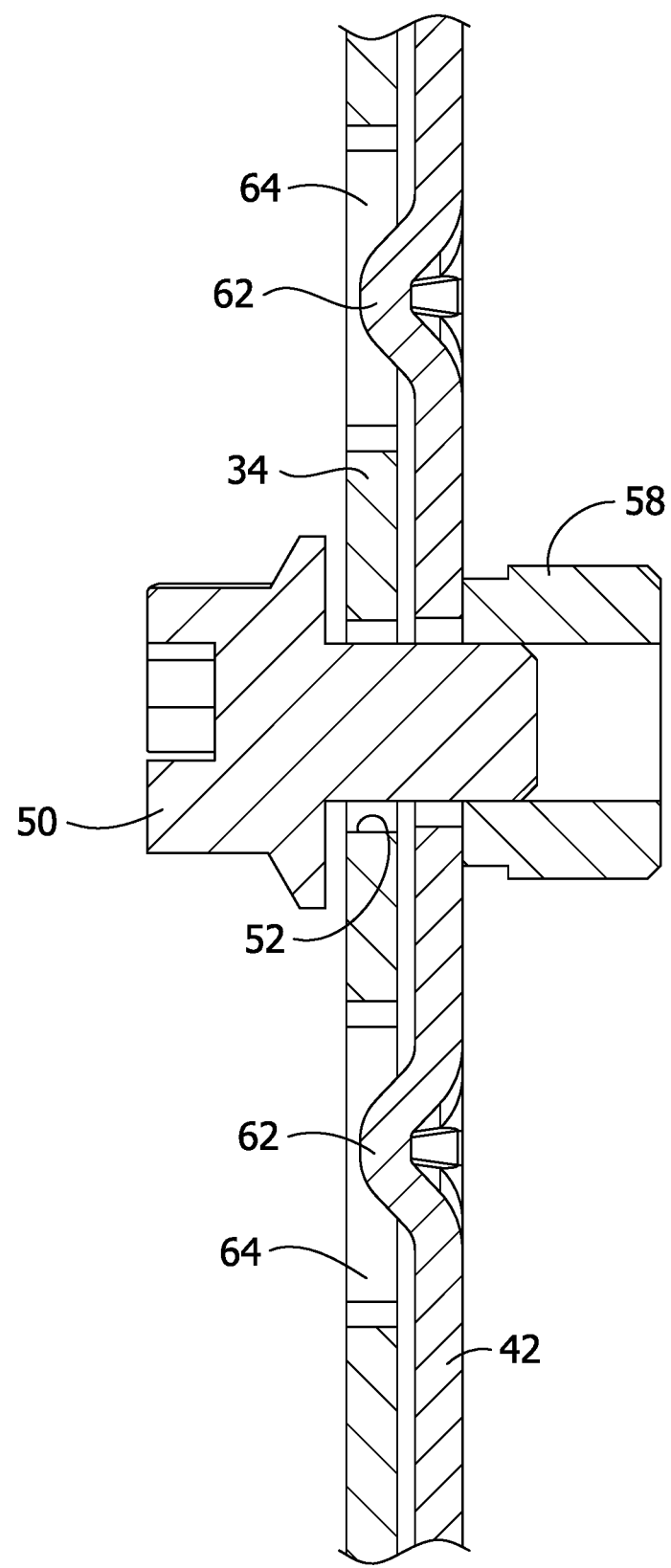
FIG. 7 is an enlarged sectional view of FIG. 6 taken in the plane defined by the line 7-7 in FIG. 6, with an upper cover removed therefrom.

As shown in FIGS. 4, 6, and 11, the illustrated plurality of the second type of snap-fit connector comprises snap-fit openings 64 defined by one or more of the sidewalls 34, 36 of the wireway body 28. In the illustrated embodiment, each of the left, right and lower sidewalls 34, 36 may define the snap-fit openings 64. In the illustrated embodiment, a pair of snap-fit openings 62 is disposed adjacent to each fastener opening 52. For example, as shown best in FIG. 6, each pair of snap-fit openings 64 includes an upper snap-fit opening above the fastener opening 52 and a lower snap-fit opening below the fastener opening. As explained in more detail below, each snap-fit opening 64 is configured to receive one of the catches 62 therein to fasten or lock the wireway connector 24 to the wireway section 22. In the illustrated embodiment, as shown in FIG. 7, the lateral extents of the catches 62 do not extend laterally through the openings 64. In this way, the lateral extents of the catches 62 do not extend outside the wireway section 22 and are not exposed. It is understood that the plurality of the second type of snap-fit connector 64 may be disposed at other locations on the corresponding sidewalls 34, 36.

As shown in FIGS. 8-11, the wireway connector 24 is insertable into the open longitudinal ends of the abutting wireway sections 22 to engage the first and second types of snap-fit connectors 62, 64 and fasten or lock the wireway connector to the abutting wireway sections. As the wireway connector 24 is inserted into one of the wireway sections 22, the longitudinal end margin of the wireway section adjacent the snap-fit openings 64 rides along the catches 62. At least one of the wireway body 28 (i.e., one or more of the sidewalls 34, 36), the connector body 40 (i.e., one or more of the side panels 42, 44), and the catches 62 are resiliently deflectable as the longitudinal end margin of the wireway section 22 adjacent the snap-fit openings 64 rides along the catches. When an interior longitudinal edge partially defining the snap-fit opening 64 clears the inner end of the corresponding catch 62, the resiliently deflected one of the wireway body 28, the connector body 40, and the catch rebounds so the catch fully enters the snap-fit opening 64 and a longitudinal end portion of the wireway body enters the clearance gap 66 to effectively lock together the wireway section 22 and the wireway connector 24, without the use of separate tools, such as a wrench or screwdriver, to inhibit the withdrawal of the wireway connector from the wireway section. The externally threaded fasteners 50 (e.g., bolts or screws) may bottom out in the fastener openings 52 (i.e., contact closed longitudinal ends of the fastener openings) to inhibit over-insertion of the wireway connector 24 in the wireway section 22. This further ensures that the catches 62 will remain properly located in the snap-fit openings 64. The fasteners 50 may then be tightened to attach the two wireway sections 22 to one another.

It is understood that in one or more embodiments, the snap-fit catch 62 may be on the wireway section 22 and the snap-fit opening 64 may be on the wireway connector 24. In such an embodiment, the functionality of the snap-fit components may be essentially the same. Accordingly, broadly in one or more embodiments the wireway section 22 has a first snap-fit component and the wireway connector 24 has a second snap-fit component, and the two snap-fit components are mateable with one another to connect the wireway connector to the wireway section.

As can be understood from the above description, the auxiliary connection acts as both a quick-connect connection and a safe-guard connection for abutting wireway sections 22. That is, the auxiliary connection allows the wireway sections 22 to be secured to one another quickly without the use of additional tools. Moreover, the auxiliary connection provides a safe-guard should the primary connection (e.g., the threaded fasteners) loosen and no longer provide secure connection to one or more of the wireway sections 22.

Figure 13:
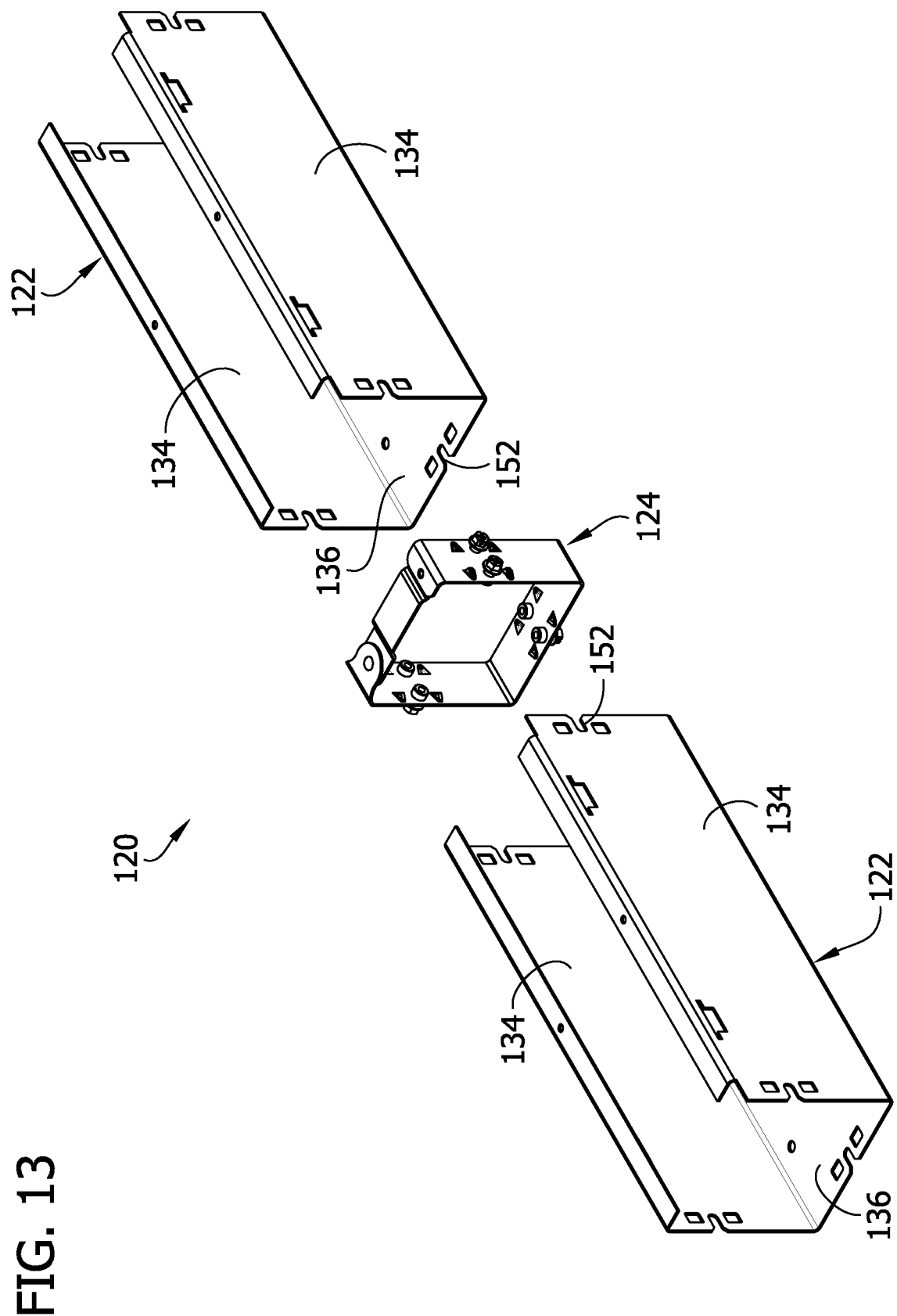
FIG. 13 is a perspective of another embodiment of a wireway system.
Figure 14A:
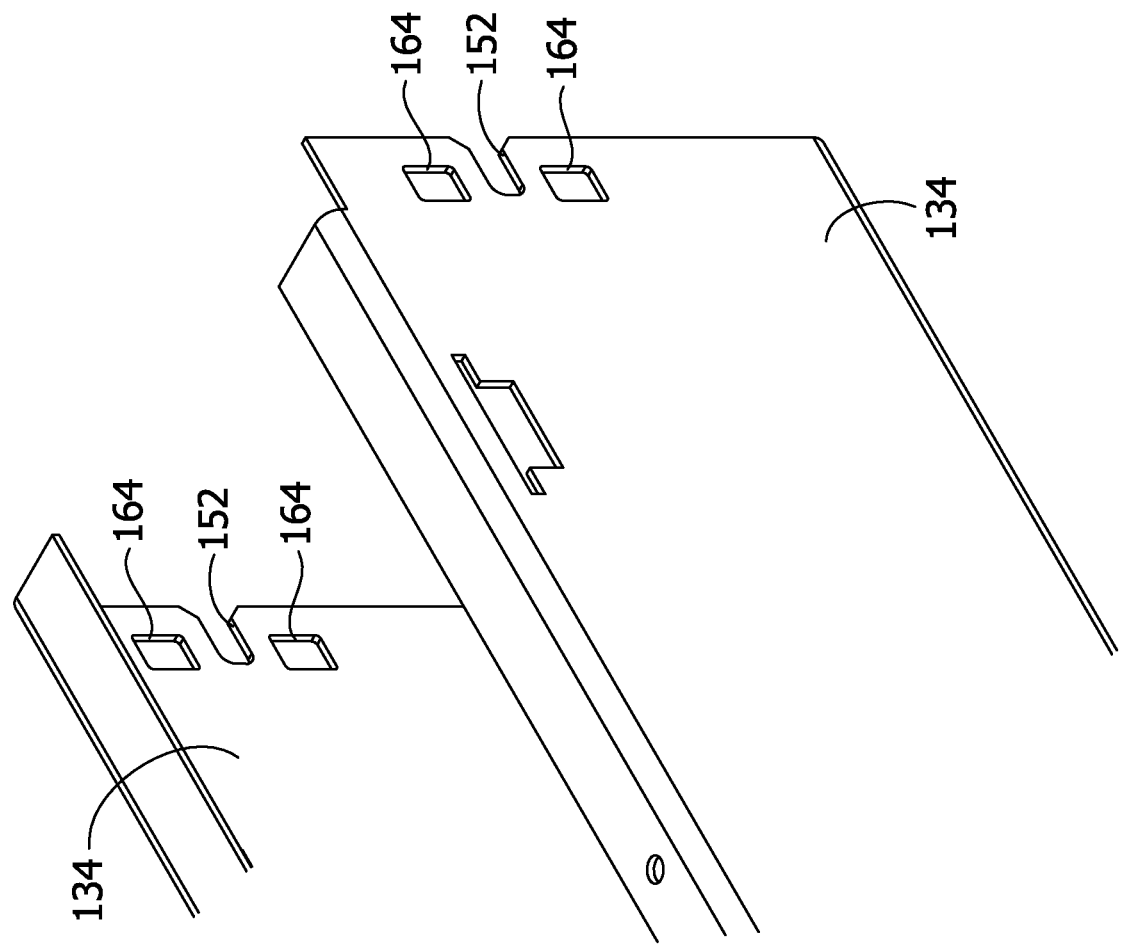
FIG. 14A is an enlarged fragmentary perspective of a wireway section of the wireway system of FIG. 13.
Figure 14B:
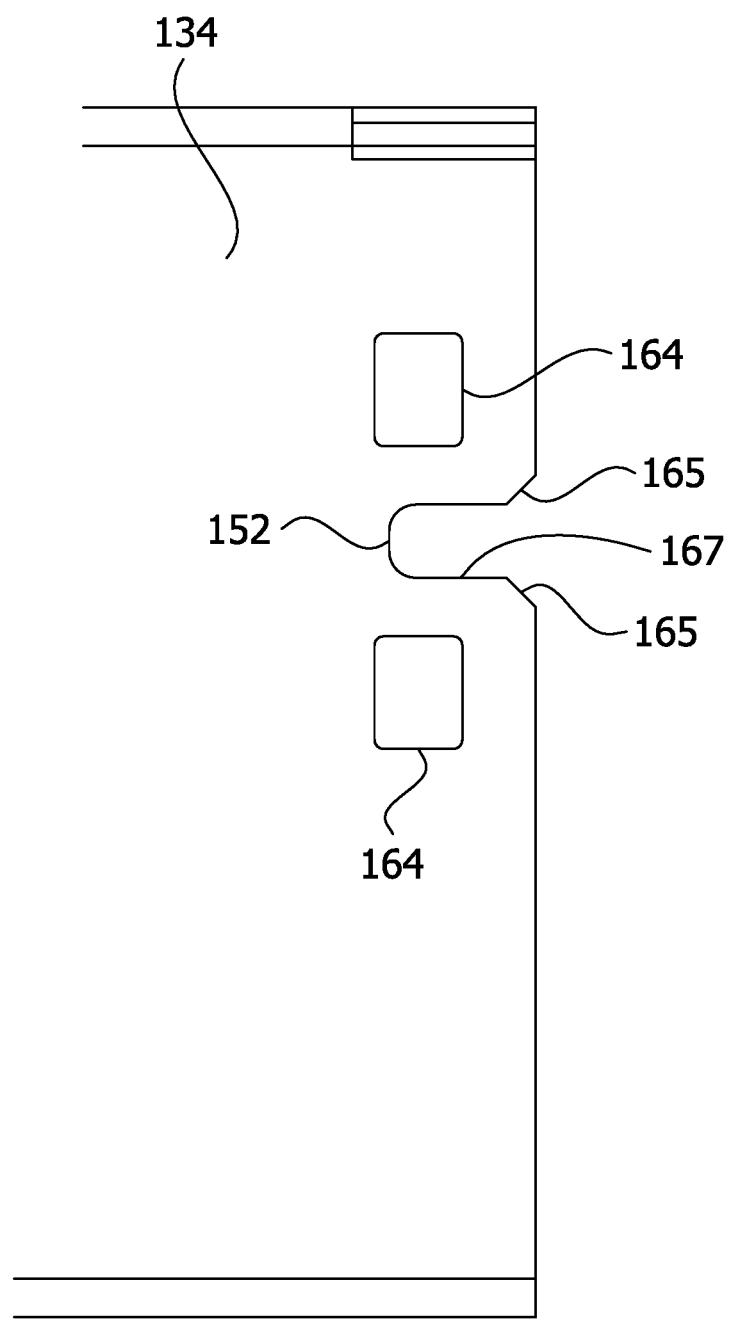
FIG. 14B is an enlarged fragmentary side view of the wireway section of the wireway system of FIG. 13.
Figure 15:
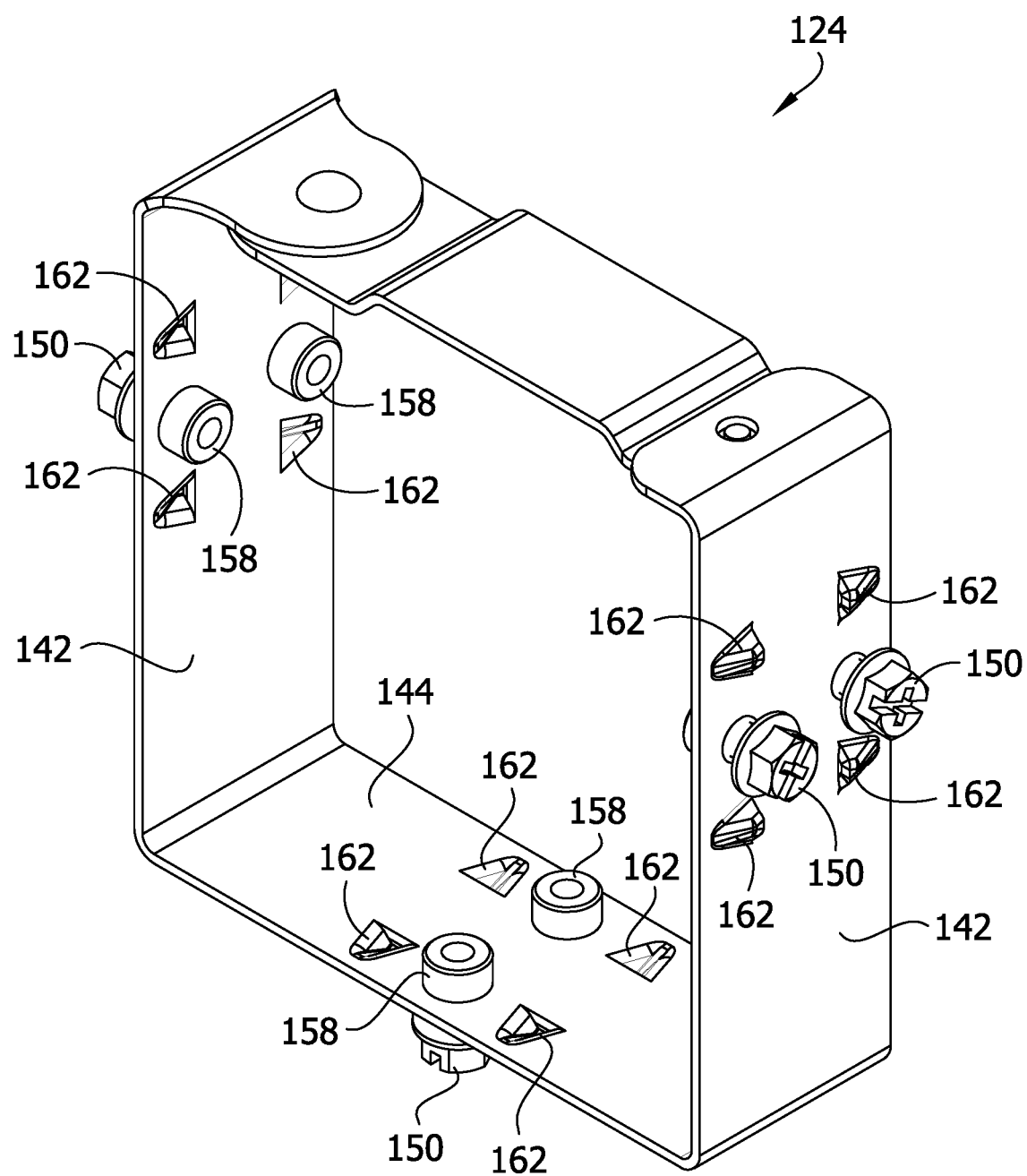
FIG. 15 is a perspective of a wireway connector of the wireway system of FIG. 13.

Referring to FIGS. 13-15, a wireway system of another embodiment is generally indicated at reference numeral 120. The wireway system 120 includes at least one wireway section 122 (e.g., two wireway sections) and at least one wireway connector 124 (e.g., one wireway connector in the illustrated embodiment), each indicated generally. The wireway system 120 is substantially similar to the wireway system 20 of the previous embodiment. Thus, the wireway system 120 operates in substantially the same way as wireway system 20. However, the wireway system 120 differs from wireway system 20 in that sidewalls 134 and 136 of the wireway sections 122 each include a single slot 152 and a single pair of snap fit openings 164 disposed adjacent the slot (FIGS. 14A and 14B). Similarly, the left and right side panels 142 and lower side panel 144 of the wireway connector 124 each includes a single pair of externally threaded fasteners 150 and corresponding internally threaded fasteners 158, and a single set of catches 162 disposed adjacent the fasteners (FIG. 15). Additionally, the slots 152 in the wireway sections 122 are defined by a pair of opposing angled edges 165 that extend from the open longitudinal ends of the wireway sections at an angle transverse to the axial direction of the wireway section, and a U-shaped edge 167 extending between the angled edges. The angled edges 165 on each side wall 134, 136 taper toward each other as they extend away from the open end of the wireway section. Thus, the angled edges 165 provide a funnel for directing the shafts of the externally threaded fasteners 150 into the slots 152.

In the illustrated embodiment, the slot 152 in the lower side wall of the wireway section 122 (FIG. 13) is centered across a width of the lower side wall 136, and the fasteners 150, 158 on the lower side panel 144 of the wireway connector 124 are centered across a width of the lower side panel for aligning with the slot 152 in the lower side wall of the wireway section. Similarly, the slots 152 in the left and right sidewalls 134 of the wireway section 122 are disposed generally at a location between a top and mid-height point of the left and right sidewalls, and the fasteners 150, 158 on the left and right panels 142 of the wireway connector 124 are disposed generally at a location between a top and mid-height point of the left and right panels for aligning with the slots 152 in the left and right sidewalls. However, it will be understood that the slots 152 and fasteners 150, 158 could be located at other positions without departing from the scope of the disclosure.

Figure 16:
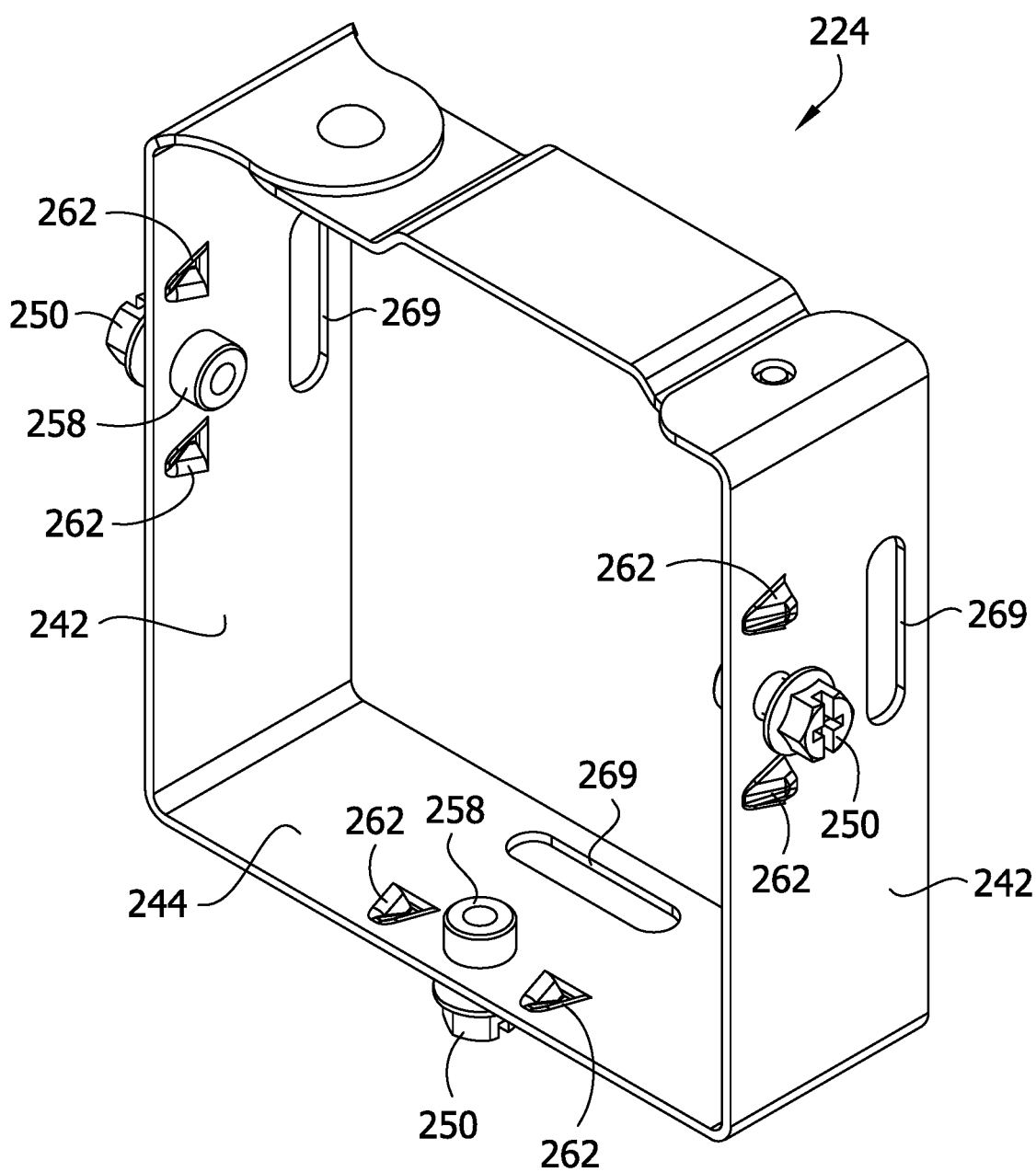
FIG. 16 is a perspective of a wireway connector of another embodiment.
Figure 17:
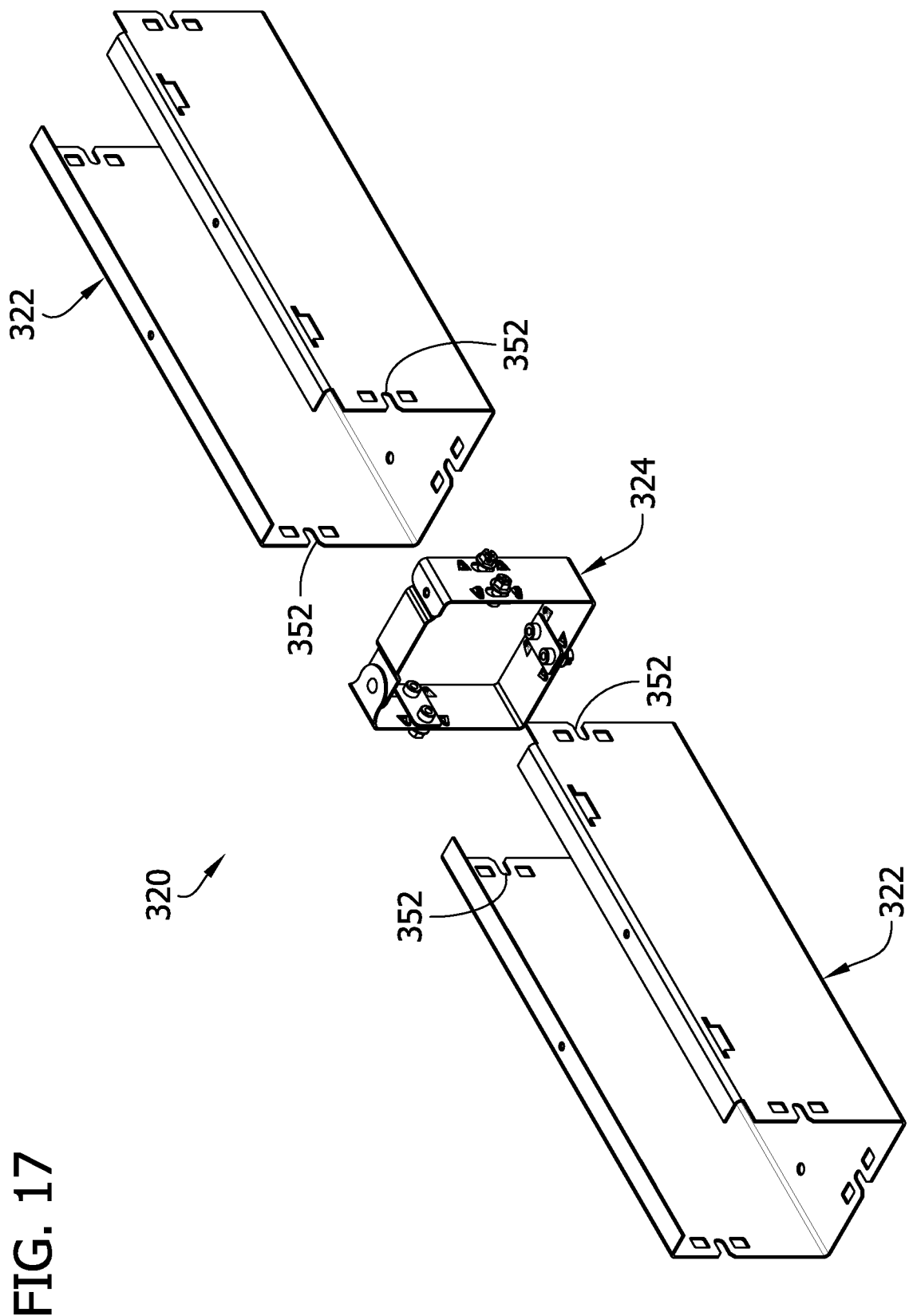
FIG. 17 is a perspective of another embodiment of a wireway system.
Figure 18:
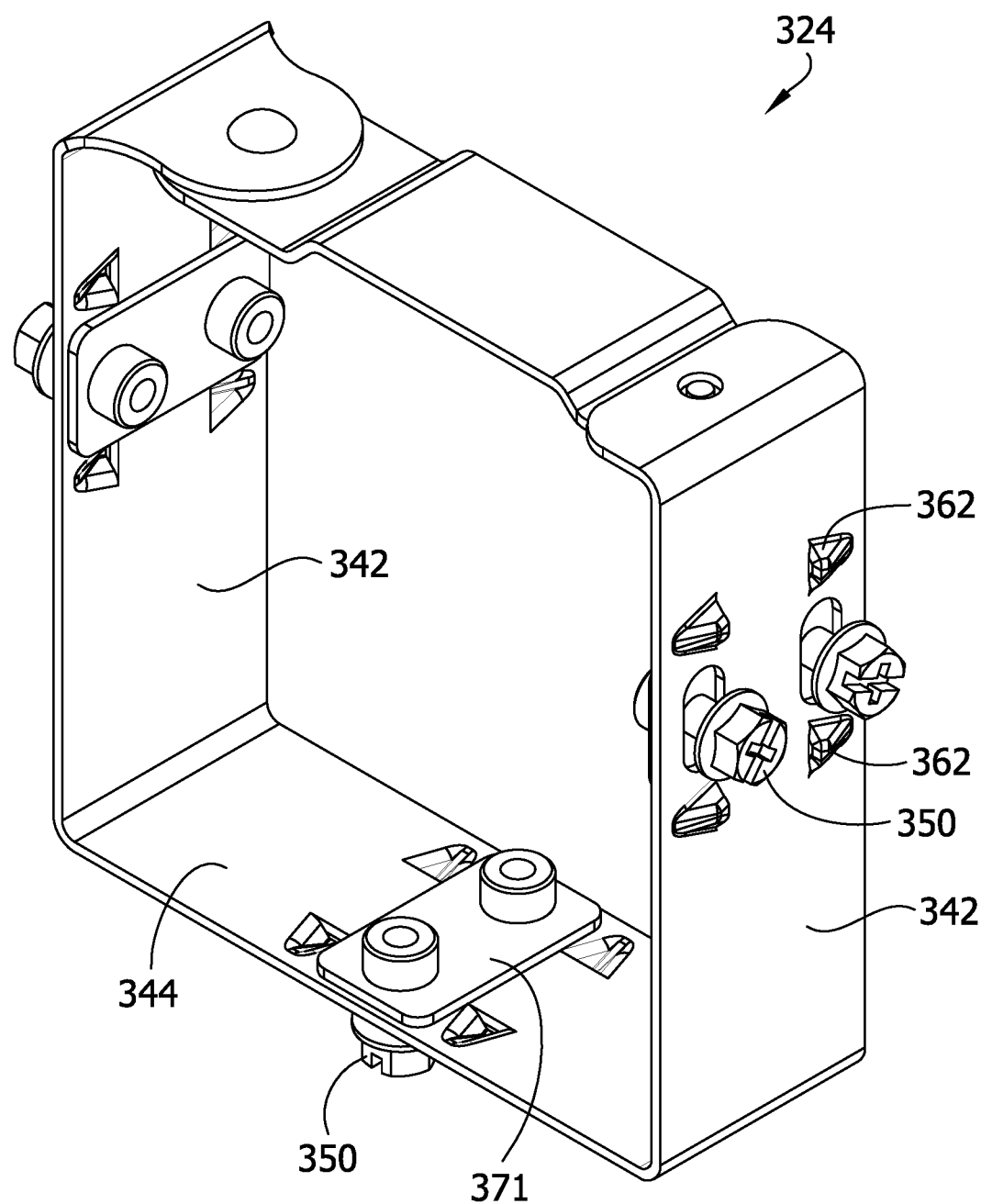
FIG. 18 is a perspective of a wireway connector of the wireway system of FIG. 17.
Figure 19:
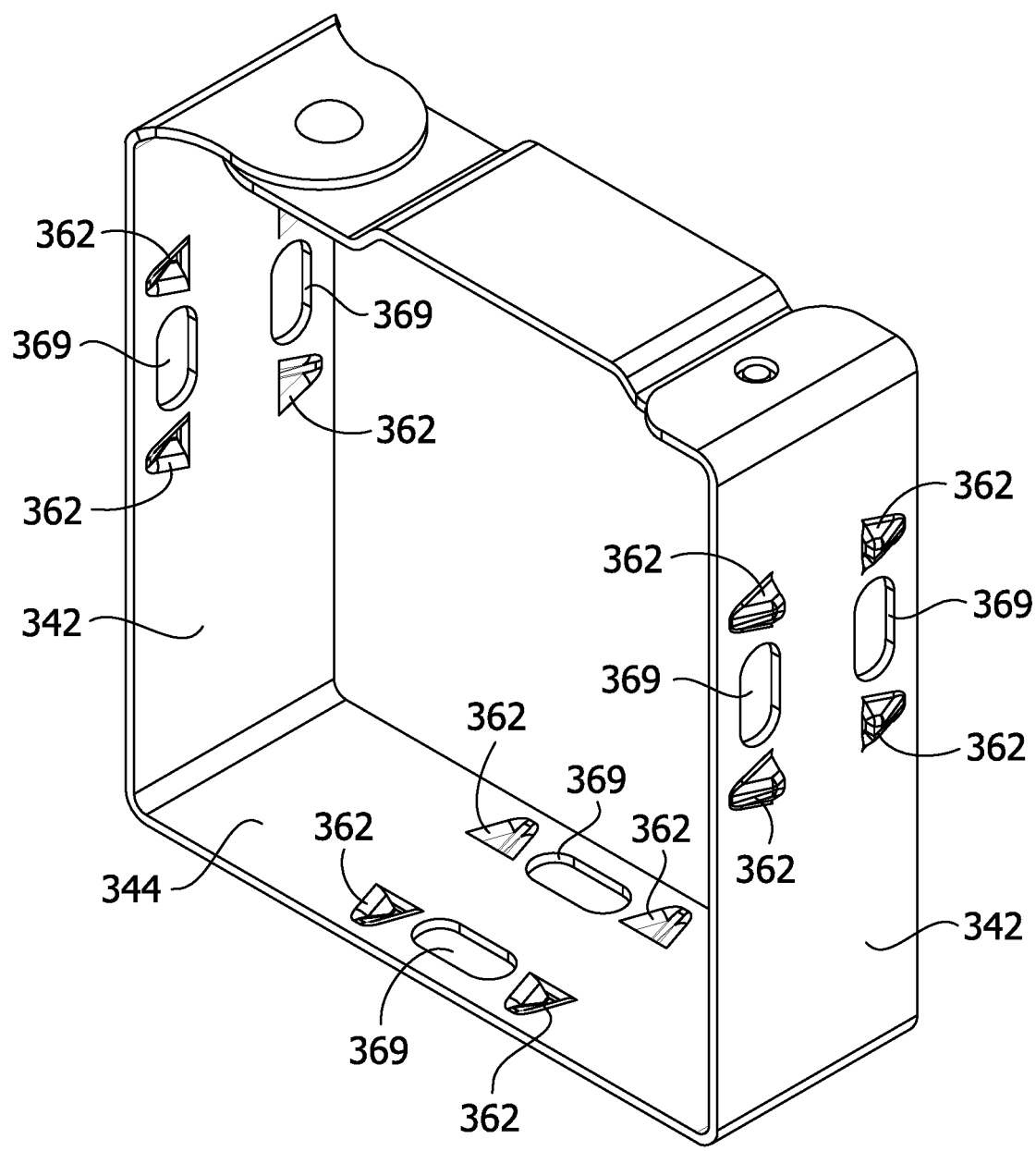
FIG. 19 is a perspective of the wireway connector of FIG. 18 with fasteners removed.
Figure 20:
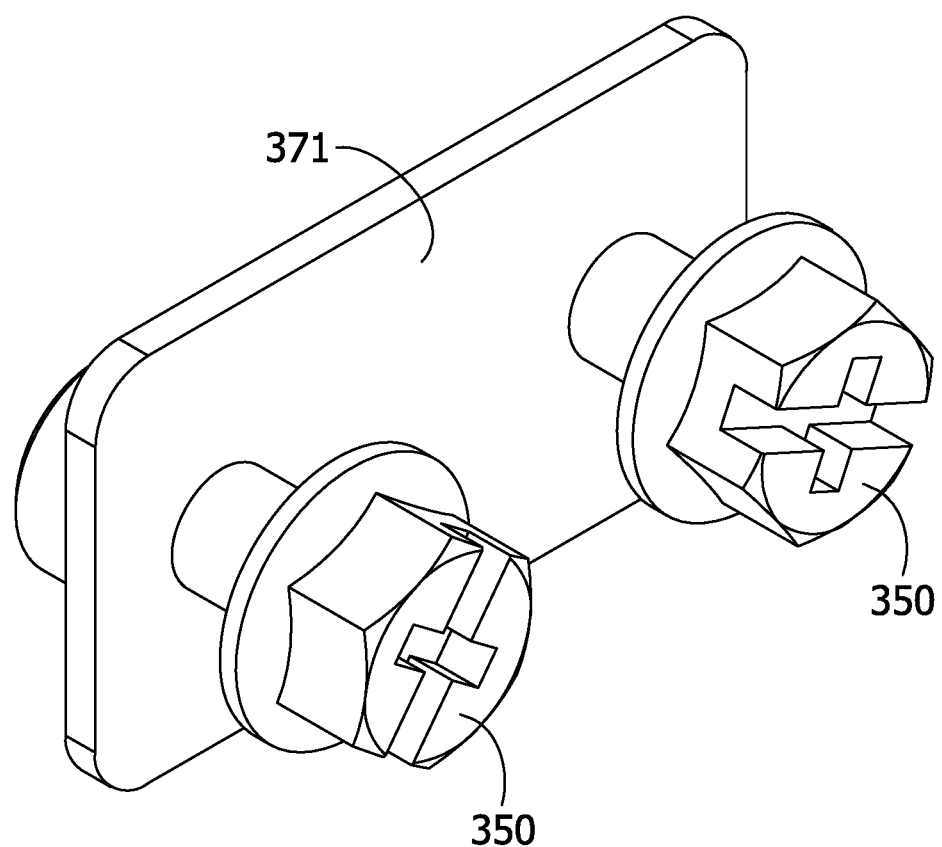
FIG. 20 is a perspective of fasteners and a plate of the wireway connector of FIG. 17.
Figure 21:
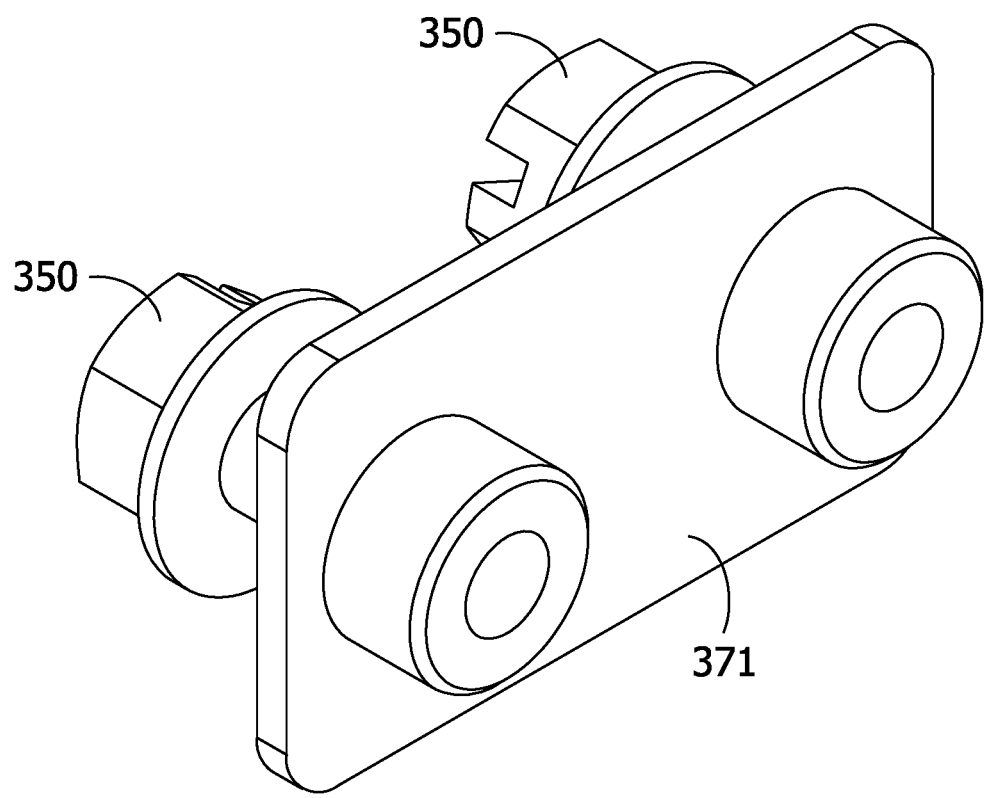
FIG. 21 is another perspective of the fasteners and plate of the wireway connector of FIG. 17.
Figure 22:
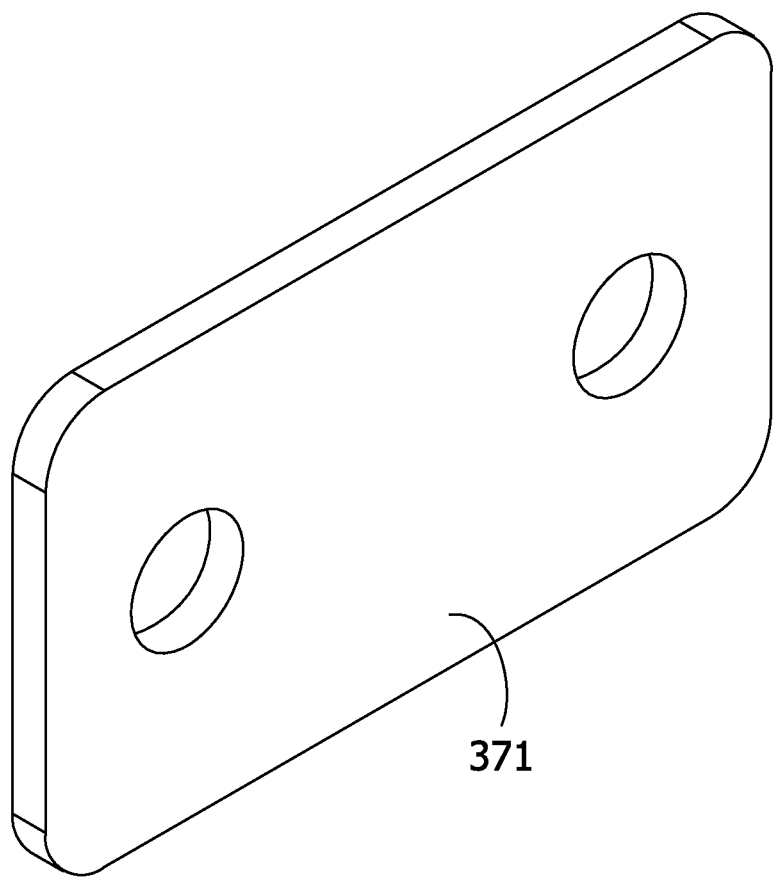
FIG. 22 is a perspective of the plate.
Figure 23:
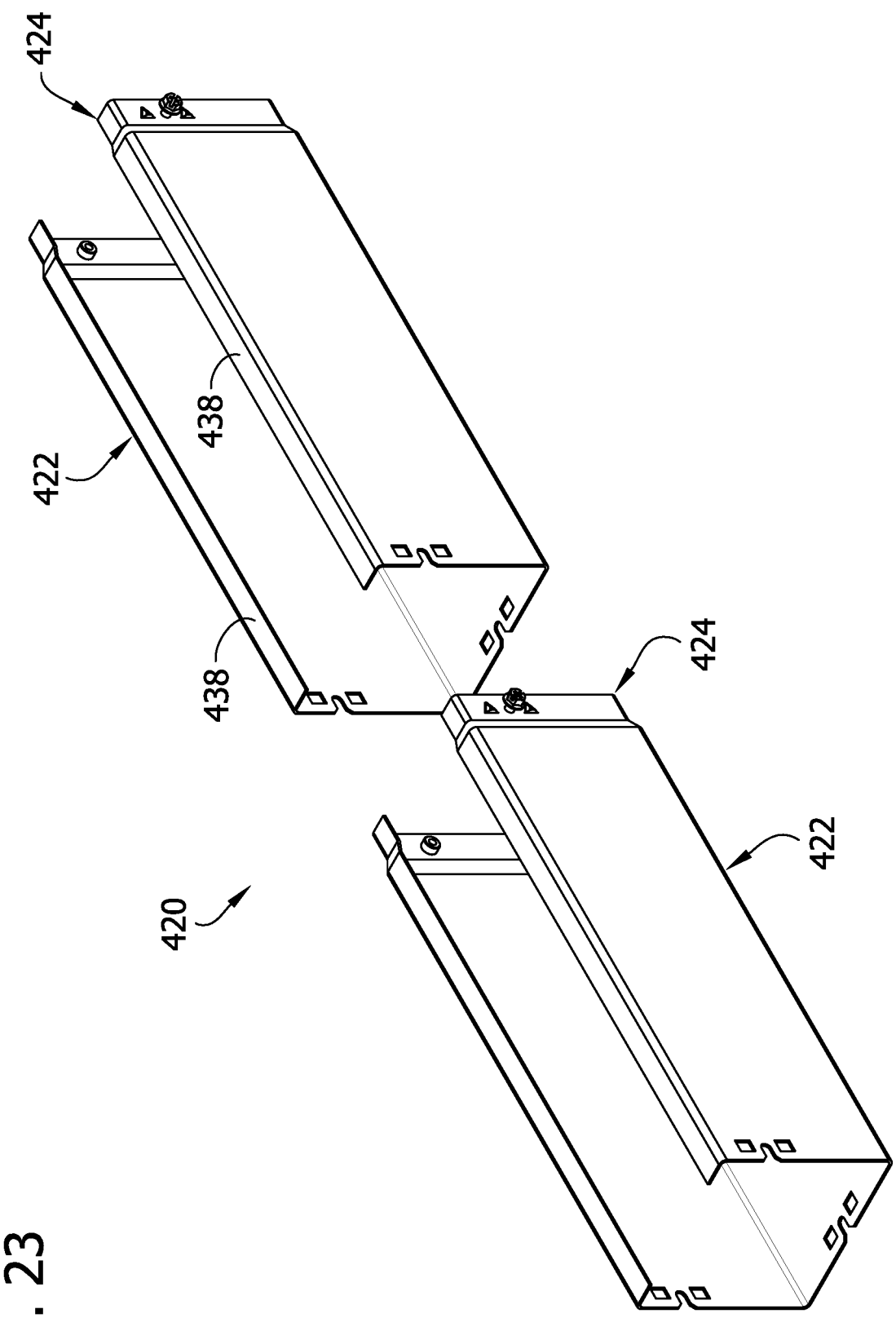
FIG. 23 is a perspective of another embodiment of a wireway system.
Figure 24:
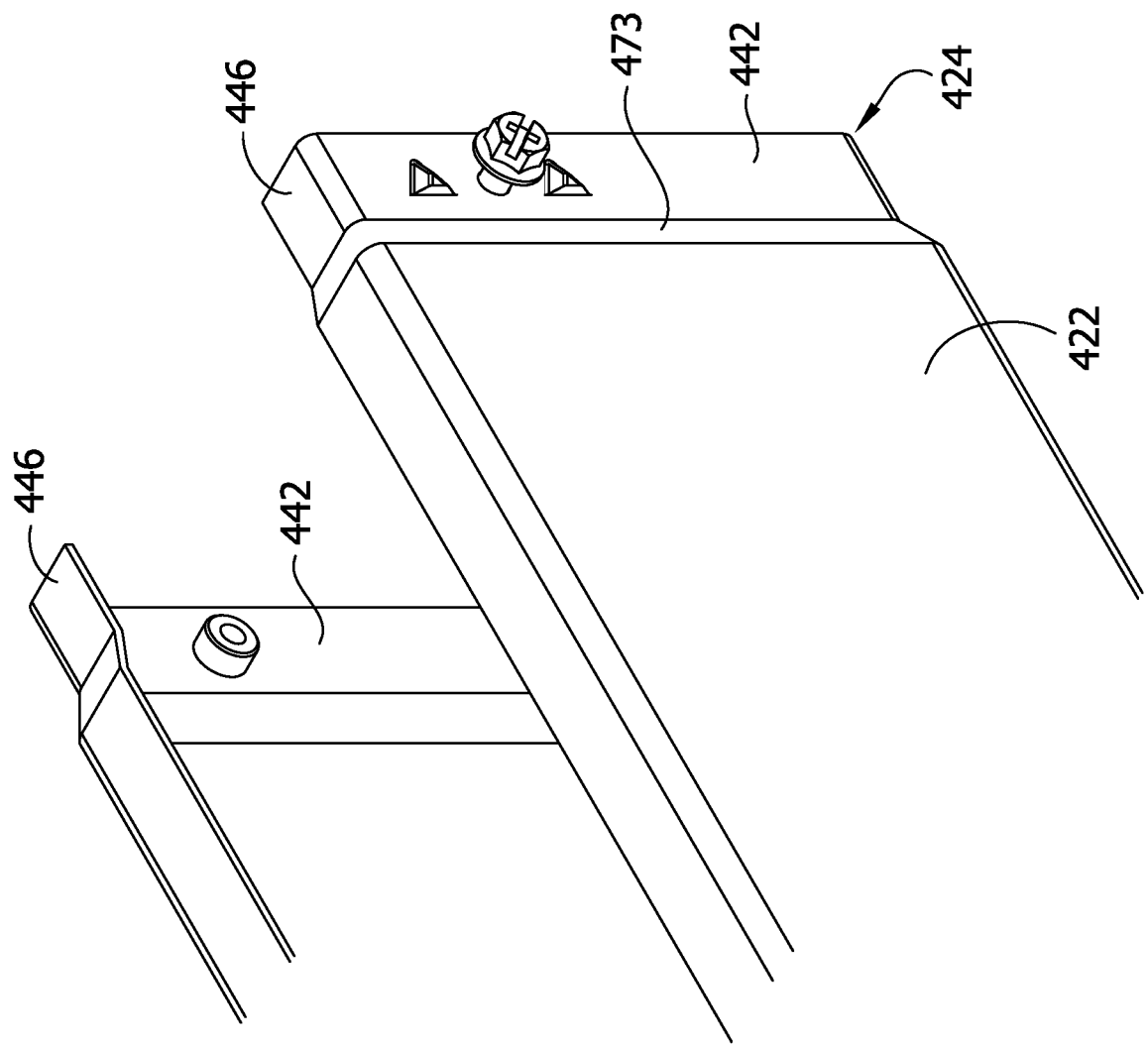
FIG. 24 is an enlarged fragmentary perspective of the wireway system of FIG. 23 showing a wireway section and a wireway connector on the wireway section.
Figure 25:
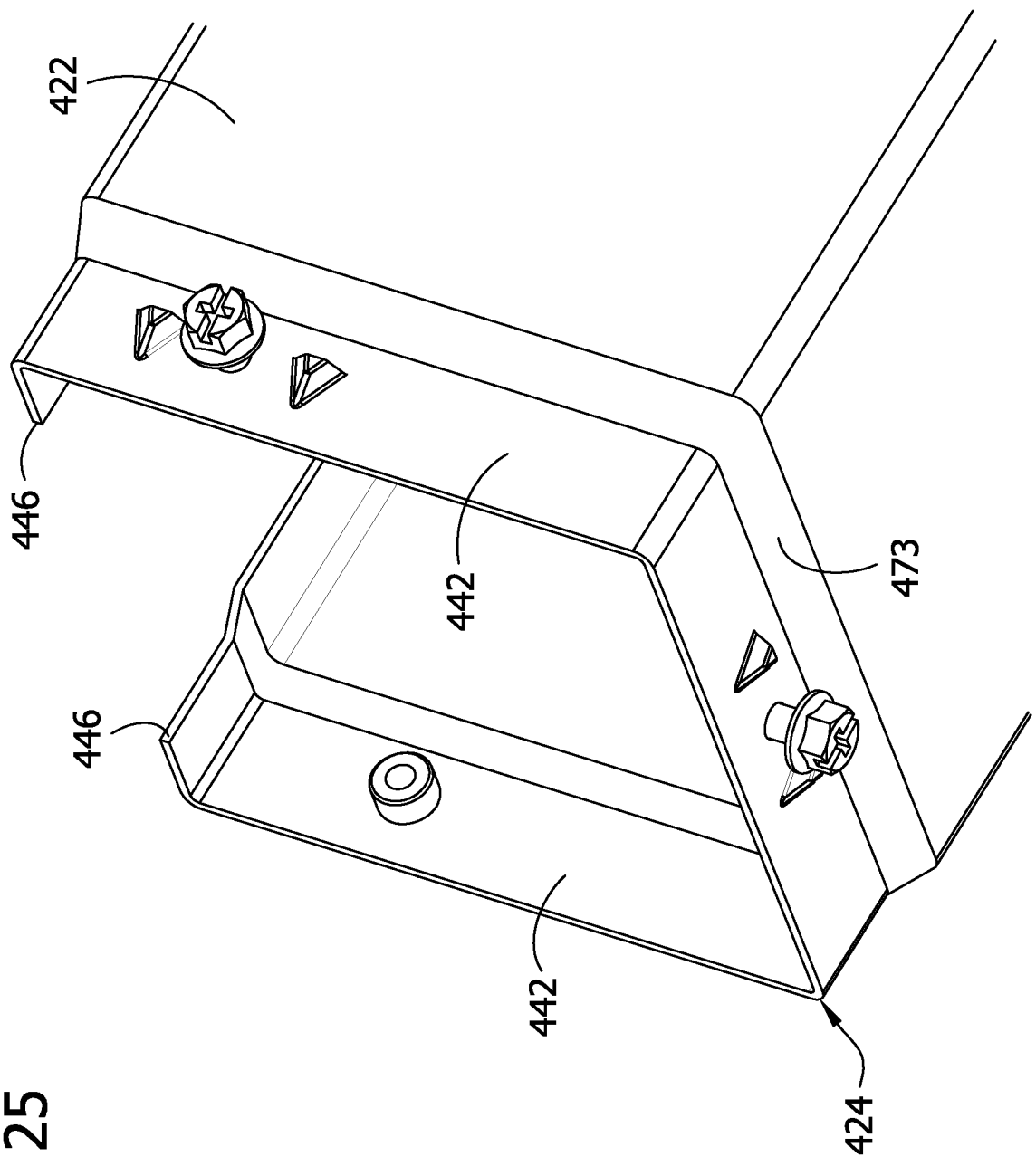
FIG. 25 is another enlarged fragmentary perspective of the wireway system of FIG. 23 showing the wireway section and the wireway connector.
Figure 26:
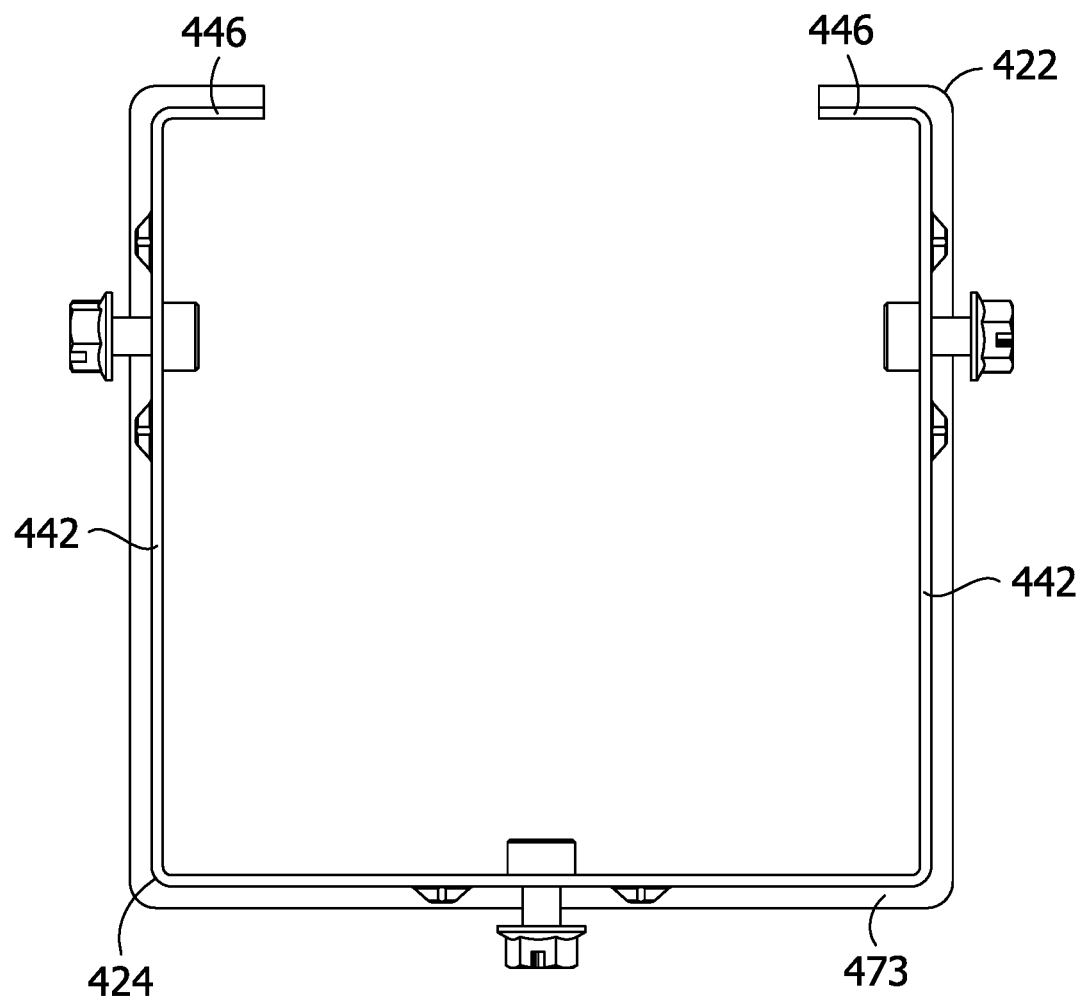
FIG. 26 is an end view of a wireway section and wireway connector of the wireway system of FIG. 23.

Referring to FIG. 16, a wireway connector of another embodiment is generally indicated at 224. The wireway connector 224 is similar to the wireway connector 124 of the previous embodiment. Thus, the wireway connector 224 operates in substantially the same way as wireway connector 124. However, the wireway connector 224 differs from wireway connector 124 in that one of the externally threaded fasteners 250 and corresponding internally threaded fasteners 258, along with the adjacent catches 262, on each of the left and right side panels 242 and the lower side panel 244 is replaced with a slot 269 that extends transversely to an axis of the wireway connector 224. In one embodiment, the slots 269 extend orthogonally to the axis of the wireway connector 224. The slots 269 are configured to receive a fastener (e.g., a threaded bolt fastener) so that one end of the wireway connector 224 can be attached to a wireway section that does not have corresponding connection features to the fasteners 250, 258 and catches 262. In particular, the fastener shaft will pass through the slot 269 and into the material, or a mating slot, in the open end of the wireway section for securing the connector 224 to the wireway section. Thus, a non-mating wireway section can be attached to at least one end of the wireway connector 224.

Referring to FIGS. 17-22, a wireway system of another embodiment is generally indicated at reference numeral 320. The wireway system 320 includes at least one wireway section 322 (e.g., two wireway sections) and at least one wireway connector 324 (e.g., one wireway connector in the illustrated embodiment), each indicated generally. The wireway system 320 is substantially similar to the wireway system 120 of the previous embodiment. Thus, the wireway system 320 operates in substantially the same way as wireway system 120. However, the wireway system 320 differs from wireway system 120 in that the externally threaded fasteners 350 are received in elongate slots 369 (FIG. 19) in the left and right side panels 342 and the lower side panel 344 rather than circular fastener holes as is shown in wireway system 120. Each slot 369 is disposed between a pair of catches 362. Each slot 369 has a length extending longitudinally along the slot, and a width extending orthogonally to the length of the slot and generally parallel to an axis of the wireway connector 324. Therefore, the length of the slots 369 extends transversely to the axis of the wireway connector 324. In one embodiment, the slots 369 extend orthogonally to the axis of the wireway connector 324. The length of the slots 369 is significantly longer than a diameter of the shafts of the externally threaded fasteners 350 which allows the fasteners to be moved along the slots. The diameter of the shafts of the externally threaded fasteners 350 is also smaller than the width of the slots 369 so that the fasteners can also be moved transversely, to a smaller degree, within the slots. Thus, the slots 369 allow the location of the externally threaded fasteners 350 to be adjusted within the slot to properly align the fasteners with the slots 352 in the wireway sections 322. Accordingly, the slots 369 provide tolerances for any misalignment between the wireway sections 322 and the wireway connector 324 as a result of their construction and/or their engagement with each other.

Additionally, shafts of each pair of externally threaded fasteners 350 are received in a plate 371 disposed at an interior of the wireway connector 324 to attach the fasteners to the plate. Thus, the plate 371 in turn couples the pair of fasteners 350 together. However, the plate 371, in combination with the slots 369, allows one of the fasteners 350 in the pair to rotate or pivot relative to the other fastener in the pair so that both fasteners can be moved longitudinally along their respective slots 369 independently of the other fastener without also causing the other fastener 350 in the pair to move longitudinally in their respective slot. In particular, the width of the slots 369 being greater than the diameter of the shafts of the fasteners 350 allows one fastener of the pair to move transversely in its slot while the other fastener 350 in the pair is moved longitudinally within its slot. Therefore, the transversely moving fastener 350 remains at substantially the same longitudinal position in its slot 369 while the other fastener 350 in the pair is moved longitudinally in its slot 369. It will also be understood that longitudinal movement of one fastener 350 in a pair may result in at least the rotational movement of the other fastener 350 in the pair. Additionally, the plate 371 allows the fasteners 350 to move conjointly within their respective slots 369.

Referring to FIGS. 23-26, a wireway system of another embodiment is generally indicated at reference numeral 420. The wireway system 420 includes at least one wireway section 422 (e.g., two wireway sections) and at least one wireway connector 424 (e.g., two wireway connectors in the illustrated embodiment), each indicated generally. The wireway system 420 is substantially similar to the wireway system 120 of the previous embodiment. Thus, the wireway system 420 operates in substantially the same way as wireway system 120. However, the wireway system 420 differs from wireway system 120 in that wireway connectors 424 are formed integrally with one of the open ends of the wireway sections 422. The opposite open end of each wireway section 422 remains open and free of a connector extending therefrom. Therefore, the wireway connector 424 on one of the wireway sections 422 is able to attach to the connector-free end of another wireway section 422 to connect the wireway sections together. In the illustrated embodiment, the wireway connectors 424 are swaged or tapered so that a perimeter or cross-sectional dimension of the connector is inset from the edge of the wireway section 422 from which the connector extends. A swaged or transition surface 473 extends between the end of the wireway section 422 and the wireway connector 424 to inset the wireway connector from the wireway section. Therefore, the wireway connector 424 will be received inside of the open end of another similarly constructed wireway section 422 to which the connector is attached. Additionally, the wireway connector 424 includes a pair of top flanges 446 extending inwardly from respective left and right side panels 442. The top flanges 446 oppose upper flanges 438 on the wireway section 422 into which the wireway connector 424 is inserted.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A wireway connector for a wireway section, the wireway section having an open longitudinal end and a plurality of sidewalls, the wireway connector comprising:
   a connector body including a plurality of side panels and configured to be attached to an open longitudinal end of a wireway section;
   a snap-fit component on at least one of the side panels, wherein the snap-fit component is configured to mateably connect to a snap-fit component on one of the sidewalls of the wireway section as the connector body is attached to the open longitudinal end of the wireway section to connect the wireway connector to the wireway section; and
   a threaded fastener secured to at least one of the side panels of the connector body and extending laterally outward therefrom.

2. The wireway connector set forth in claim 1, further comprising a cinch nut secured to the threaded fastener to secure the threaded fastener to said at least one of the side panels of the connector panel.

3. The wireway connector set forth in claim 1, wherein the snap-fit component on at least one of the side panels comprises a snap-fit catch extending laterally outward from the side panel.

4. The wireway connector set forth in claim 3, wherein the snap-fit catch comprises a pair of snap-fit catches spaced apart from and aligned with one another to define a clearance gap therebetween.

5. The wireway connector set forth in claim 3, in combination with the wireway section having the open longitudinal end and the plurality of sidewalls, wherein at least one of the sidewalls defines a snap-fit opening in which the snap-fit catch is configured to be received.

6. The wireway connector set forth in claim 5 in combination with the wireway section, further comprising a threaded fastener secured to at least one of the side panels of the connector body and extending laterally outward therefrom, wherein at least one of the sidewalls of the wireway section defines a slot-shaped fastener opening extending longitudinally through the open longitudinal end of the wireway section.

7. The wireway connector set forth in claim 6 in combination with the wireway section, wherein the slot-shaped fastener opening has an elongate shape.

8. The wireway connector set forth in claim 1, wherein said at least one of the side panels of the connector body defines a slot.

9. A wireway section comprising:
   an elongate wireway body including a plurality of sidewalls defining an interior of the wireway section configured to receive one or more wires or cables therein, wherein the wireway body includes opposite longitudinal ends; and
   a snap-fit component on at least one of the sidewalls adjacent one of the longitudinal ends, wherein the snap-fit component is configured to mateably connect to a snap-fit component on a side panel of a wireway connector as the wireway connector is attached to the open longitudinal end of the wireway section to connect the wireway connector to the wireway section;
   wherein at least one of the sidewalls of the wireway section defines a slot-shaped fastener opening extending longitudinally through the open longitudinal end of the wireway section, wherein the slot-shaped fastener opening is configured to receive a threaded fastener on the wireway connector.

10. The wireway section set forth in claim 9, wherein the slot-shaped fastener opening is elongate.

11. The wireway section set forth in claim 9, wherein the snap-fit component on at least one of the sidewalls comprises a snap-fit opening.

12. The wireway section set forth in claim 11, wherein the snap-fit opening comprises first and second snap-fit openings on opposite sides of the slot-shaped fastener opening.

13. A wireway system comprising:
   a wireway section including at least one sidewall defining an interior, and having a longitudinal end; and
   a wireway connector including at least one side panel, the wireway connector configured to be attached to the longitudinal end of the wireway section, wherein the wireway connector and the wireway section are configured to together form a locking connection automatically upon the wireway connector being inserted into the longitudinal end of the wireway section, without the use of a separate tool, to inhibit the withdrawal of the wireway connector from the wireway section;

wherein the wireway connector and the wireway section are configured to form a second connection with one another that is separate from the locking connection, wherein the wireway connector comprises a threaded fastener, and the wireway section defines a slot-shaped opening configured to slidably receive the threaded fastener, whereby tightening the threaded fastener within the slot-shaped opening forms the second connection.

14. The wireway system set forth in claim 13, wherein the locking connection comprises a snap-fit connection.

15. The wireway system set forth in claim 13, wherein the locking connection comprises a snap-fit catch extending laterally outward from the at least one side panel of the wireway connector, and a snap-fit opening in the at least one sidewall of the wireway section, wherein the snap-fit catch is configured to be received in the snap-fit opening upon insertion of the wireway connector into the longitudinal end of the wireway section.

16. The wireway system set forth in claim 13 wherein the wireway section comprises a first wireway section, the wireway connector being formed integrally with a second wireway section for connecting the first and second wireway sections together.

\* \* \* \* \*